(12) United States Patent
Booth et al.

(10) Patent No.: US 11,921,033 B2
(45) Date of Patent: Mar. 5, 2024

(54) SINGLE-SHOT MUELLER MATRIX POLARIMETER

(71) Applicant: Oxford University Innovation Limited, Oxford (GB)

(72) Inventors: Martin Booth, Oxford (GB); Chao He, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 289 days.

(21) Appl. No.: 17/311,377

(22) PCT Filed: Dec. 9, 2019

(86) PCT No.: PCT/GB2019/053474
§ 371 (c)(1),
(2) Date: Jun. 7, 2021

(87) PCT Pub. No.: WO2020/120942
PCT Pub. Date: Jun. 18, 2020

(65) Prior Publication Data
US 2022/0026347 A1    Jan. 27, 2022

(30) Foreign Application Priority Data

Dec. 10, 2018 (GB) ...................... 1820089

(51) Int. Cl.
*G01N 21/21* (2006.01)
*G01J 4/02* (2006.01)
*G01N 21/47* (2006.01)

(52) U.S. Cl.
CPC ............. *G01N 21/21* (2013.01); *G01J 4/02* (2013.01); *G01N 21/474* (2013.01); *G01N 2021/4745* (2013.01)

(58) Field of Classification Search
CPC .. G01N 21/49; G01N 2333/445; G01N 21/00; G01N 21/6458; G01N 2021/4742;
(Continued)

(56) References Cited

U.S. PATENT DOCUMENTS 5,247,176 A * 9/1993 Goldstein ................ G01J 4/00
356/367
7,298,480 B2 * 11/2007 Garcia-Caurel .......... G01J 4/04
356/364

(Continued)

FOREIGN PATENT DOCUMENTS

CN    105492889 A  *  4/2016  ............... G01J 4/00
CN    108918425 A  *  11/2018
(Continued)

OTHER PUBLICATIONS

International Search Report and Written Opinion for WO 2020/120942 (PCT/GB2019/053474), dated Feb. 17, 2020, pp. 1-19.
(Continued)

*Primary Examiner* — Michael P Stafira
(74) *Attorney, Agent, or Firm* — Thomas Horstemeyer, LLP

(57) ABSTRACT

A single-shot Mueller matrix polarimeter (1700), MMP, comprising: a polarization state generator (1706), PSG, arranged to receive a source optical field (1704) and provide a probe field (1708) having a plurality of spatial portions, each portion having a different polarization state; a polarization state analyser (1718), PSA, arranged to receive a modified probe field (1716) resulting from interaction of the probe field generated by the PSG with a sample under investigation, and further arranged to apply, to each of a corresponding plurality of spatial portions of the modified
(Continued)

probe field, a plurality of retardances and a plurality of fast axis orientations; and a detector (1720) arranged to detect an output (1722) of the PSA.

18 Claims, 43 Drawing Sheets

(58) Field of Classification Search
CPC ... G01N 2021/6419; G01N 2021/6441; G01N 21/6428; G01N 21/4795; G01N 21/4788; G01N 2021/479; G01N 2201/0826; G01N 2021/4759; G01N 21/6408; G01N 21/6456; G01N 21/6486; G01N 2201/0675; G01N 2201/0866; G01N 2201/088; G01N 11/10; G01N 15/14; G01N 2011/008; G01N 2021/4761; G01N 2021/6421; G01N 2021/6463; G01N 2021/6484; G01N 2021/653; G01N 21/35; G01N 21/359; G01N 21/45; G01N 29/00; G01N 33/48; G01N 33/48721; G01N 33/54373; G01N 33/582; G01N 21/211; G01N 21/21; G01N 2021/213; G01N 2201/0683; G01N 2201/0636; G01N 21/23; G01N 2440/00; G01N 33/57415; G01N 33/57434; G01N 33/6842; G01N 33/6857; G01N 2201/08; G01N 21/01; G01N 21/31; G01N 21/65; G01N 21/8422; G01N 2201/12; G01N 2021/4792; G01N 2021/214; G01N 21/274; G01N 2201/0633; G01N 2333/4713; G01N 33/683; G01N 21/13; G01N 21/8806; G01N 2021/8444; G01N 21/55; G01N 21/84; G01N 21/9501; G01N 2021/3137; G01N 2021/3148; G01N 21/314; G01N 21/658; G01N 21/94; G01N 2201/0231; G01N 2201/0612; G01N 280/06; G01N 2021/3177; G01N 2021/3188; G01N 2201/0639; G01N 2021/0106; G01N 2021/0367; G01N 2021/8848; G01N 21/0332; G01N 21/05; G01N 21/29; G01N 21/474; G01N 21/59; G01N 21/8803; G01N 21/90; G01N 21/9027; G01N 21/95; G01N 2201/061; G01N 2500/00; G01N 33/57438; G01N 33/57484; G01N 21/4133; G01N 21/4738; G01N 21/64; G01N 2500/04; G01N 2021/4709; G01N 2021/4745; G01N 2021/9513; G01N 21/17; G01N 2201/021; G01N 2021/1725; G01N 2021/177; G01N 21/178; G01N 2021/216; G01N 2021/8841; G01N 2021/8854; G01N 2021/8887; G01N 21/1717; G01N 21/41; G01N 21/8851; G01N 2800/52; G01N 33/49; G01N 33/574; G01N 15/00; G01N 2021/0112; G01N 2021/151; G01N 2021/3155; G01N 2021/4707; G01N 2021/4735; G01N 2021/4773; G01N 2021/4797; G01N 2021/655; G01N 2021/8472; G01N 21/3581; G01N 21/47; G01N 21/958; G01N 2201/02; G01N 33/5308; G01N 33/573; G01N 33/6854; G01N 33/6896; G01N 15/0205; G01N 15/1429; G01N 15/1434; G01N 2021/212; G01N 2021/217; G01N 2021/3185; G01N 2021/95638; G01N 21/93; G01N 21/956; G01N 2201/0227; G01N 2201/023; G01N 2201/0634; G01N 2201/0693; G01N 2201/084; G01N 2201/121; G01N 2201/127; G01N 2201/12746; G01N 2333/705; G01N 2333/924; G01N 2560/00; G01N 2800/28; G01N 2800/2821; G01N 2800/348; G01N 2800/50; G01N 2800/56; G01N 2800/60; G01N 33/15; G01N 33/5011; G01N 33/5023; G01N 33/53; G01N 33/54306; G01N 33/57407; G01N 33/57419; G01N 33/57446; G01N 33/57492; G01N 33/6845; G01N 33/6872; G01N 33/743; G01N 33/92; G01J 4/04; G01J 4/00; G01J 3/447; G01J 3/2823; G01J 3/0224; G01J 3/02; G01J 4/02; G01J 3/021; G01J 3/0229; G01J 1/02; G01J 1/04; G01J 2003/2826; G01J 3/0208; G01J 3/44; G01J 3/0235; G01J 3/027; G01J 3/457; G01J 2003/1269; G01J 2003/451; G01J 3/26; G01J 3/36; G01J 3/4412; G01J 3/45; G01J 3/0237; G01J 3/04; G01J 3/10; G01J 9/00; G01J 1/0242; G01J 1/0411; G01J 1/0414; G01J 1/0429; G01J 1/58; G01J 3/0202; G01J 3/0205; G01J 3/2803; G01J 1/0295; G01J 1/0418; G01J 1/0451; G01J 3/0286; G01J 3/0289; G01J 3/0297; G01J 3/12; G01J 3/14; G01J 3/18; G01J 1/0252; G01J 1/0266; G01J 1/0425; G01J 1/0437; G01J 1/0462; G01J 1/42; G01J 2003/064; G01J 2003/1213; G01J 2003/1282; G01J 3/0213; G01J 3/0218; G01J 3/0262; G01J 3/0291; G01J 3/2889; G01J 3/42

See application file for complete search history.

(56) References Cited

U.S. PATENT DOCUMENTS

| | | | | |
|---|---|---|---|---|
| 7,952,711 | B1* | 5/2011 | Chen | G01N 21/23 356/365 |
| 2015/0100277 | A1* | 4/2015 | Smith | G01N 21/21 702/189 |
| 2016/0091416 | A1* | 3/2016 | Freudenthal | G01N 21/21 356/364 |
| 2016/0313185 | A1* | 10/2016 | Ma | G01J 4/04 |
| 2018/0252695 | A1* | 9/2018 | Huang | G01N 21/4738 |
| 2018/0271430 | A1 | 9/2018 | Ramella-Roman | |

FOREIGN PATENT DOCUMENTS

| | | | | |
|---|---|---|---|---|
| FR | 2937732 A1 * | 4/2010 | | G01N 21/211 |
| WO | 2009/146476 A1 | 12/2009 | | |

OTHER PUBLICATIONS

UK Search Report for GB 1820089.9, dated May 16, 2019, pp. 1-3.
Toshitaka Wakayama et al: "Axisymmetrical Mueller matrix polarimeter", Proceedings of SPIE, vol. 7461, Aug. 11, 2009 (Aug. 11, 2009), pp. 74610M-I.
Jintao Chang et al: "Single-shot spatially modulated Stokes polarimeter based on a GRIN lens", Optics Letters, vol. 39, No. 9, May 1, 2014 (May 1, 20014), p. 2656.
Sarah Forward et al: "Flexible polarimetric probe for 3 x 3 Mueller matrix measurements of biological tissue", Scientific Reports, vol. 7. No. 1, Sep. 20, 2017 (Sep. 20, 2017).

(56) References Cited

OTHER PUBLICATIONS

Santosh Tripathi et al: "Rapid Mueller matrix polarimetry based on parallelized polarization state generation and detection", Optics Express, vol. 17, No. 24, Jan. 1, 2009 (Jan. 1, 2009), pp. 21396-21407.
Falk Toppel et al: "Classical entanglement in polarization metrology", New Journal of Physics, Institute of Physics Publishing, Bristol, GB, vol. 16, No. 7, Jul. 16, 2014 (Jul. 16, 2014), p. 73019.
Chao He et al: "Complex vectorial optics through gradient index lens cascades", Nature Communications, vol. 10, No. 1, Sep. 19, 2019 (Sep. 19, 2019), XP055665069.

* cited by examiner

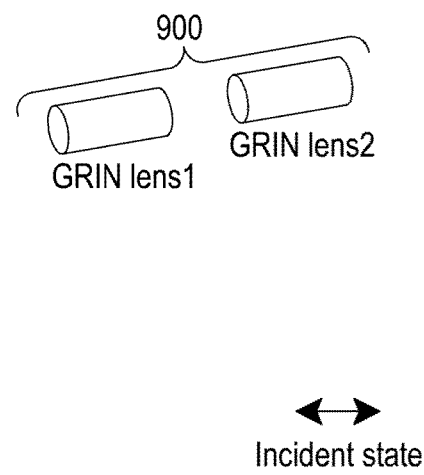
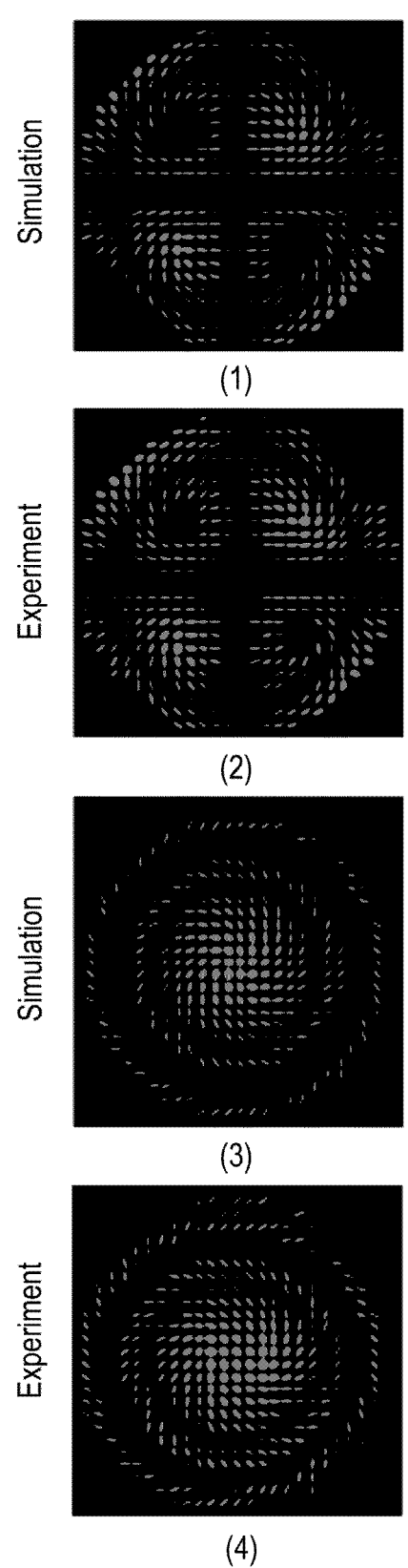
Fig. 9a

SINGLE-SHOT MUELLER MATRIX POLARIMETER

CROSS-REFERENCE TO RELATED APPLICATIONS

This application is the National Stage of International Application No. PCT/GB2019/053474, filed Dec. 9, 2019, which claims priority to GB 1820089.9, filed Dec. 10, 2018, which are entirely incorporated herein by reference.

TECHNICAL FIELD

The present disclosure relates to a method and apparatus for performing single-shot Mueller matrix polarimetry.

BACKGROUND

Polarimetric techniques are up-and-coming tools for recognizing complex biological samples, as a label-free, anisotropic structure sensitive and multiply scattered photons suppressed technique, it can be used to acquire the information of superficial epithelium. Currently, cancer is one of the biggest threats to human health. It is reported that more than 85% of cancer cases start with a tumour developed from a superficial layer of the tissue, which implies the strong potential of polarimetric techniques in early cancer detection. Among various polarimetric techniques, Mueller matrix polarimetry is advantageous because it is capable of extracting comprehensive polarization properties of a sample. Mueller matrix polarimeters are usually designed based on time-sequentially generating and analysing states of polarization of light by rotating polarization components or modulating variable retarders in polarization generating and analysing stages of a polarimetry device. However, in general, time sequential measurement is not suitable for fast-moving object detection, as it leads to unexpected measurement errors and hence would have limitations when used for in vivo detection to assist the clinical diagnosis.

The project leading to this application has received funding from the European Research Council (ERC) under the European Union's Horizon 2020 research and innovation programme (grant agreement No 695140).

Accordingly it is an object of the present disclosure to provide an improved device and method for performing Mueller matrix polarimetry.

SUMMARY OF DISCLOSURE

According to a first aspect of the disclosure there is provided a single-shot Mueller matrix polarimeter, MMP, comprising:
- a polarization state generator, PSG, arranged to receive a source optical field and provide a probe field having a plurality of spatial portions, each portion having a different polarization state;
- a polarization state analyser, PSA, arranged to receive a modified probe field resulting from interaction of the probe field generated by the PSG with a sample under investigation, and further arranged to apply, to each of a corresponding plurality of spatial portions of the modified probe field, a plurality of retardances and a plurality of fast axis orientations; and
- a detector arranged to detect an output of the PSA.

Because the probe field has a plurality of spatial portions, each having a different polarization state, it is possible to obtain enough information to reconstruct the complete Mueller matrix of the sample in a single shot, i.e. a single acquisition from the detector, without requiring time-sequentially generating and analysing states of polarization of light by rotating polarization components, or modulating variable retarders in polarization generating and analysing stages of the polarimetry device. This means that data acquisition can be performed faster and therefore mitigates the effect of time-varying samples which is an issue for in vivo detection of biological samples, for example.

The plurality of retardances may comprise a plurality of retardances spanning $\pi$ radians. The plurality of fast axis orientations comprises a plurality of orientations spanning $\pi$ radians.

The plurality of retardances may comprise a plurality of retardances spanning at least 132 degrees, or including a retardance of at least 132 degrees and/or 180 degrees.

The plurality of retardances may comprise a continuum of retardances spanning $\pi$ radians. The plurality of fast axis orientations may comprise a continuum of orientations spanning $\pi$ radians.

The PSG may be arranged to provide a probe field having four spatial portions, each spatial portion having a different polarization state, i.e. being described by a different Stokes vector. The four different Stokes vectors corresponding to the four polarization states generated by the PSG may be linearly independent.

The PSA may comprise a pair of gradient-index, GRIN, lenses having a half wave plate located there between—the modified probe field being transmitted through the GRIN lenses and half wave plate to said output.

The PSA may further comprise a linear polarizer after the pair of GRIN lenses.

The PSG may be arranged to provide a probe field having four spatial portions in the form of different segments of a single beam, each segment having a different polarization state.

The PSG may comprise a linear polarizer followed by a four-quadrant quarter wave plate, FQWP.

The four quadrants of the FQWP may have fast axes oriented at 0 degrees, 30 degrees, 60 degrees and −45 degrees relative to an axis of the linear polarizer.

The half wave plate of the PSA may have a fast axis orientation of 45 degrees with respect to a boundary between any two adjacent quadrants of the FQWP.

The PSG may be arranged to provide a probe field having four spatial portions in the form of four spatially separate beams, and the PSA may be arranged to receive a modified probe field resulting from back-scattering of the probe field from the sample.

The PSG may comprise four radially distributed optical fibres each terminated at a respective quarter wave plate.

Each optical fibre may receive a portion of a common source optical field, or each optical fibre may be coupled to a respective source each of which is arranged to provide a respective source optical field.

The MMP may further comprise a plurality of ball lenses, one associated with each of the optical fibres, and arranged to focus the probe field onto the sample.

The MMP may further comprise an output optical fibre, or bundle of output optical fibres, arranged to collect the output of the PSA and transmit it to the detector.

The detector may be an array detector such as a CCD.

The MMP may further comprise a light-emitting diode, or a laser, and a spectral filter, arranged to provide said source optical field The GRIN lenses in the PSA may be arranged to provide a birefringence induced retardance of at least 132 degrees, preferably at least 180 degrees.

The GRIN lenses in the PSA may have different birefringence profiles, wherein each GRIN lens provides a birefringence induced retardance of at least 132 degrees, preferably at least 180 degrees.

According to a second aspect of the disclosure there is provided a hardware processor system and a non-transitory computer readable storage medium storing machine-readable instructions, wherein the processor system is arranged to receive data derived from an output of the detector of the MMP according to the first aspect, the data being representative of a spatially-varying intensity of the plurality of portions of the modified probe field at the output of the PSA, wherein the machine-readable instructions, when executed, cause the processor system to reconstruct the Mueller matrix of the sample from said data.

According to a third aspect of the disclosure there is provided a method for use in performing singe-shot Mueller matrix polarimetry, the method comprising:

at a polarization state generator, PSG, receiving a source optical field and transforming it into a probe field having a plurality of spatial portions, each portion having a different polarization state;

at a polarization state analyser, PSA, receiving a modified probe field resulting from interaction of the probe field generated by the PSG with a sample under investigation, and applying, to each of a corresponding plurality of spatial portions of the modified probe field, a plurality of retardances and a plurality of fast axis orientations; and detecting an output of the PSA.

The method may further comprise receiving, at a hardware processor system, data derived from an output from the detector and executing, on the hardware processor system, machine-readable instructions stored on a non-transitory computer readable storage medium to cause the processor system to reconstruct the Mueller matrix of the sample from said data, the data being representative of the spatially-varying intensity of the modified probe field at the output of the PSA.

The features (including optional features) of any aspect may be combined with those of any other aspect, as appropriate.

BRIEF DESCRIPTION OF THE DRAWINGS

Example embodiments will be described, by way of example only, with reference to the drawings, in which:

FIGS. 9a to 9j show a number of further experimental results of the polarization states contained in VVBs generated using apparatuses according to the present disclosure;

Figure 1:
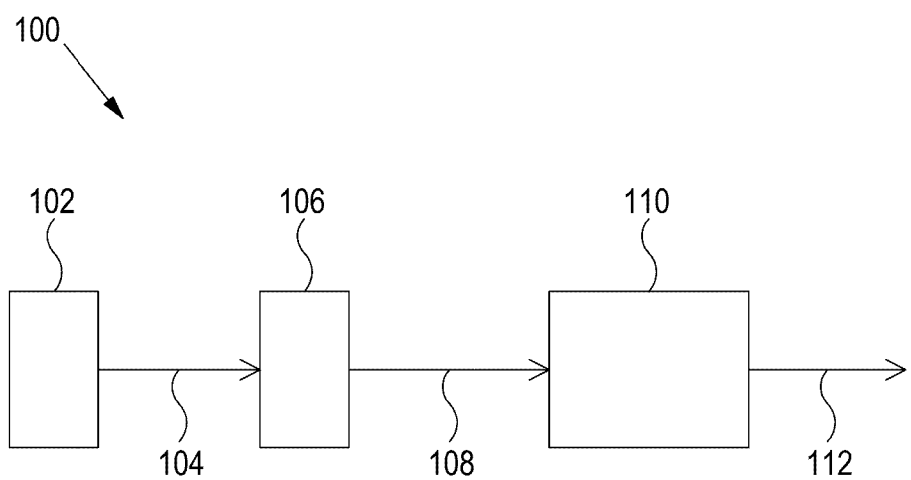
FIG. 1 is a block diagram of an apparatus for generating vector vortex beams (VVB) having non-uniform polarization states and containing orbital angular momentum (OAM), or generating OAM beams that have uniform polarization states.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

The gradient-index (GRIN) lens is a rigid rod-like imaging lens, which generally has a gradient refractive index profile and flat surfaces to guide light via a cosine ray trace. During the fabrication of GRIN lenses, the ion-exchange process introduces stresses along the radial direction of the GRIN lens rod and induces an intrinsic birefringence, which is usually treated as an unwanted, negative side-effect. However, according to the present disclosure, the gradually changing profile of this intrinsic birefringence is exploited to provide a spatial modulator for both absolute phase and polarization, whilst retaining the imaging capability of the GRIN lens. Further descriptions of the GRIN lens are provided towards the end of the description.

Vector Vortex Beam Generation

Vector vortex beams (VVBs) possess both vector polarization and helical phase. Such beams may have application in complex light beam engineering, as well as enabling modification of the shape of a beam focus for e.g. microscopy, for super-resolution applications, or can be used to demonstrate Moebius band-like topologies. One type of vector beam called a full Poincaré beam, which is named by its unique characteristic of containing all of the polarization states on the Poincaré sphere, is receiving increasing research attention due to promising applications.

The following description discusses the generation and validation of the full Poincaré beam, according to aspects of the present disclosure. The inner, gradually-changing birefringence property of the GRIN lens could be thought of as being equivalent to a spatially-variant wave plate array with gradually increasing linear retardance along the radial direction and which contains all the fast axis directions twice along the azimuthal direction. As such, the GRIN lens can be described in the Jones Matrix representation as:

$$J_{GRIN} = \begin{bmatrix} \sin^2(\theta) + \epsilon \cos^2(\theta) & (\epsilon - 1)\sin(\theta)\cos(\theta) \\ (\epsilon - 1)\sin(\theta)\cos(\theta) & \cos^2(\theta) + \epsilon \sin^2(\theta) \end{bmatrix} \quad (1)$$

where $\epsilon = e^{i\sigma} = \cos(\sigma) + i \sin(\sigma)$, and $\sigma = f(r) \propto n_e(r)$ which is the retardance profile of the target retarder. Here $\theta$ is the fast axis direction of the equivalent wave plate which equals to the azimuthal angle in the cylindrical-coordinate system, r is the radius of the section of GRIN lens, $\sigma$ is the linear retardance value of the equivalent wave plate at the fixed r and $\theta$. Suppose an incident polarization state $J_{in} = [\cos \phi, e^{i\delta} \sin \phi]^T$ impinges on every point on the GRIN lens cross section. This state is determined by a specific angle $\phi$ of two components compared with the horizontal direction and a retardance (phase) $\delta$ between two components. The output polarization state $J_{out}$ can be easily yielded by $J_{out} = J_{GRIN} \cdot J_{in}$ according to the usual Jones calculus. Taking advantage of the unique gradually-changing birefringence profile (both linear retardance and azimuthal varying orientations) of the GRIN lens, the inventor has appreciated that arrangements employing one or more GRIN lenses, and optionally other optical components in addition, are able to generate various vector vortex beams when choosing different incident states of polarization.

FIG. 1 illustrates schematically an apparatus 100 for 1) generating VVBs that have non-uniform polarization states and contain OAM, or 2) generating OAM beams that have a uniform polarization state. according to the present disclosure. The apparatus comprises a light source 102 which is arranged to provide a source field 104, a polarization state generator 106 (PSG) which is arranged to manipulate the source field to provide a modified field 108 having a single polarization state; and a transformation module 110 which is arranged to receive the modified field from the PSG and transform it to provide an output field 112, wherein the transformation module comprises a cascade of (GRIN) lenses. The output field could be a vector vortex beam.

Figure 2:
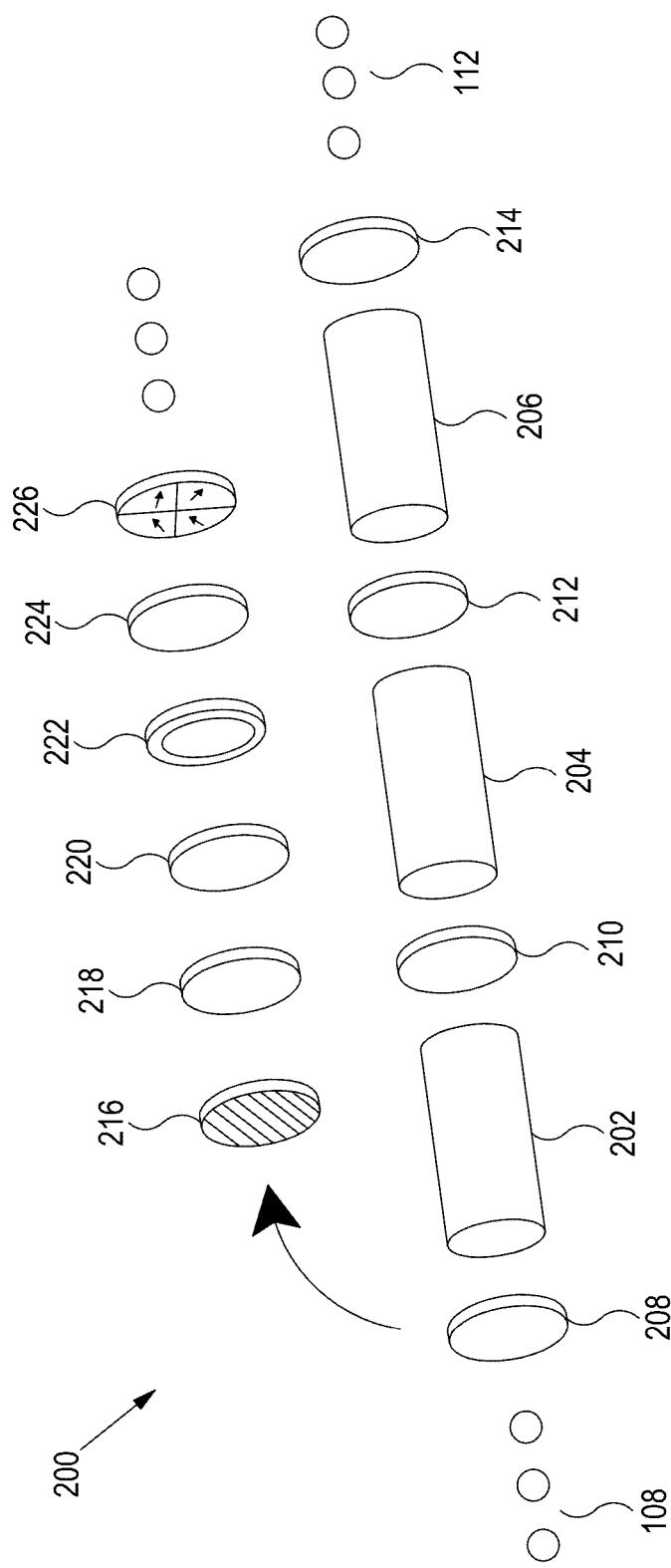
FIG. 2 is a schematic illustration of a transformation module of an apparatus for generating VVBs having non-uniform polarization states and containing OAM, or generating OAM beams that have uniform polarization states.

An exemplary transformation module 200 is illustrated in greater detail in FIG. 2. In general, it comprises a cascade of GRIN lenses 202, 204, 206, i.e. two or more GRIN lenses arranged in series, and one or more sets of interstitial components 208, 210, 212, 214. The sets of interstitial components may be between at least one pair of GRIN lenses in the cascade of GRIN lenses and/or before the cascade of GRIN lenses and/or after the cascade of GRIN lenses. In FIG. 2 there is a set of interstitial components (each of which may be just a single component) between each pair of adjacent GRIN lenses in addition to interstitial components before and after the cascade of GRIN lenses but alternative arrangements are also envisaged as described in greater detail below. Example interstitial components which may be employed in each set of interstitial components are: a linear polarizer 216 (LP), a quarter wave plate 218 (QWP), a half wave plate 220 (HWP); a spatially-variant half wave plate 222 (SHWP); a vector phase plate 224; and a four quadrant quarter wave plate array 226 (FQWP) with four different fast axis orientations.

Figure 3:
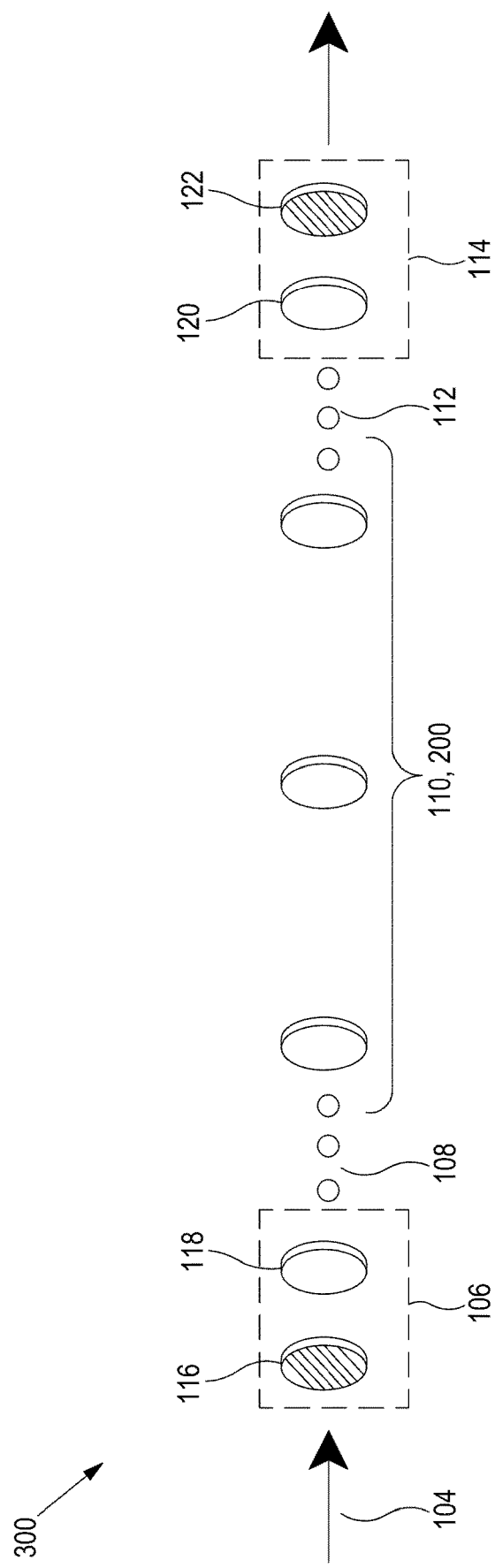
FIG. 3 is a schematic illustration of an exemplary apparatus for generating VVBs having non-uniform polarization states and containing OAM, or generating OAM beams that have uniform polarization states.

FIG. 3 illustrates schematically an exemplary apparatus 300 for 1) generating vector vortex beams (VVB) that have non-uniform polarization states and contain orbital angular momentum (OAM), or 2) generating OAM beams that have uniform polarization states. The apparatus comprises a PSG 106, and transformation module 110, 200 as above. In addition, the apparatus comprises a polarization state analyser 114 (PSA) after the transformation module which is arranged to select a single polarization state of the output field 112. According to this example, the PSA comprises an output QWP 120 and an output LP 122 arranged after the QWP. The PSG comprises an input LP 116 and an input QWP 118. In the case of VVB generation, the PSA is optional and usually only used to characterize the generated light since the VVB has non-uniform polarization states. In the case of OAM beam generation, the PSA is used to filter out a specific polarization state of light resulting in an OAM beam having a uniform polarization state.

Figure 4:
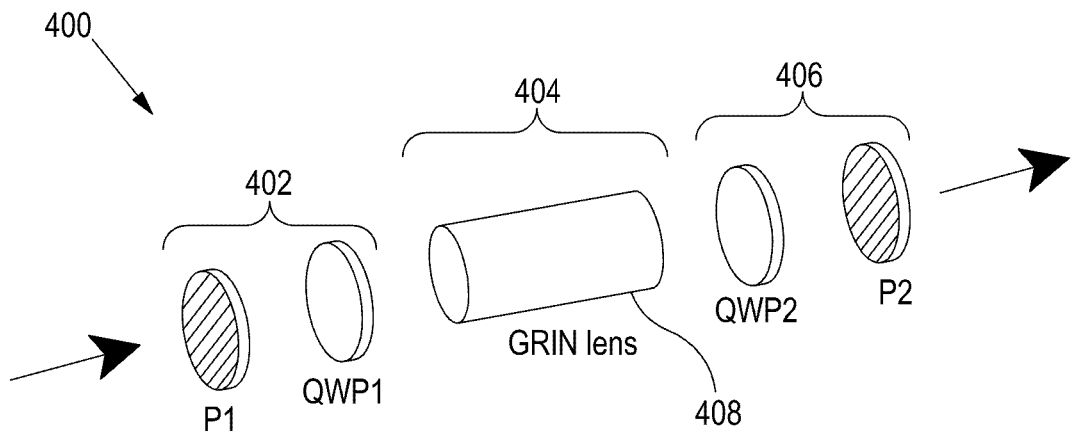
FIG. 4 is a schematic illustration of a further exemplary apparatus for generating VVBs having non-uniform polarization states and containing OAM.
Figure 5:
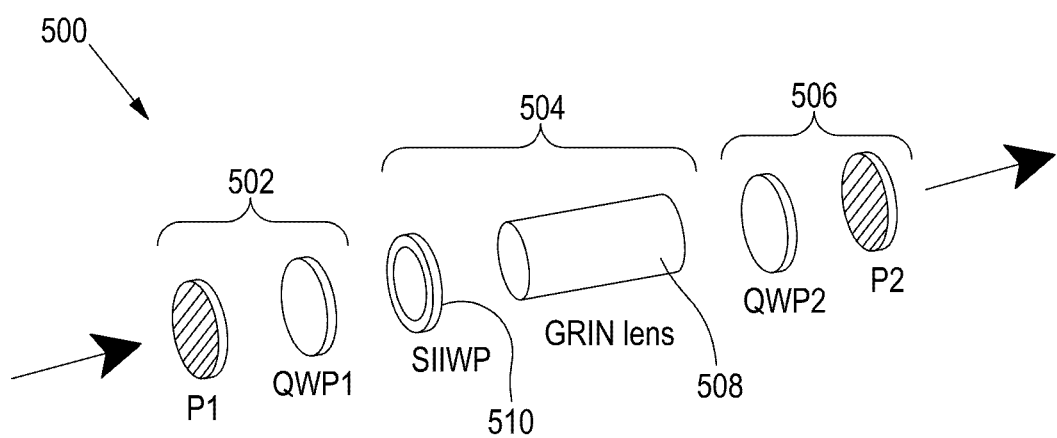
FIG. 5 is a schematic illustration of a further exemplary apparatus for generating VVBs having non-uniform polarization states and containing OAM.

FIGS. 4 and 5 illustrate two further exemplary apparatuses 400 and 500 for 1) generating vector vortex beams (VVB) that have non-uniform polarization states and contain orbital angular momentum (OAM), or 2) generating OAM beams that have uniform polarization states. The apparatus 400 of FIG. 4 comprises a PSG 402 (in the form of a polarizer P1 followed by a quarter wave plate QWP1), transformation module 404, and PSA 406 (in the form of a quarter wave plate QWP1 followed by a polarizer P1). The transformation module 404 comprises a single GRIN lens 408 with no interstitial components. The apparatus 500 of FIG. 5 comprises a PSG 502, transformation module 504, and PSA 506. The transformation module 504 comprises a single GRIN lens 508 in combination with a spatially-variant half wave plate 510. It should be appreciated that the PSA may not be required in some applications, e.g. vector vortex beam generation, but can assist in the analysis of the generated beams and therefore may optionally be included, as mentioned above.

FIGS. 6a to 6e show experimental results and simulations corresponding to the polarization states contained in various vector vortex beams generated by a single GRIN lens transformation module, i.e. using an apparatus such as that described above with reference to FIG. 4, when having different polarization states generated by the PSG incident on the GRIN lens. The polarization states are defined with respect to the horizontal direction and they are: 0 and 90 degrees linearly polarized light (patterns 600 and 602 respectively in FIG. 6a), right hand and left hand elliptically polarized light with P1 at 0 degrees for both cases, QWP1 at 22.5 degree and −67.5 degree separately in the PSG (patterns 604 and 606 respectively in FIG. 6b), right and left hand circular polarized light (patterns 608 and 610 respectively in FIG. 6c), right hand and left hand elliptically polarized light with P1 at 0 degree for both cases, QWP1 at 67.5 degree and −22.5 degree separately in the PSG (patterns 612 and 614 respectively in FIG. 6d), and 45 and −45 degree linear polarized light (patterns 616 and 618 respectively in FIG. 6e). The red colour indicates a right hand circular polarization state, the blue colour indicates the left hand circular polarization state and the green colour indicates a linear polarization state. The light field patterns in the larger circles represent experimental results and the small circles are simulation counterparts. It should be noted that there is an excellent correspondence between the simulated results and the experimental results.

Figure 7:
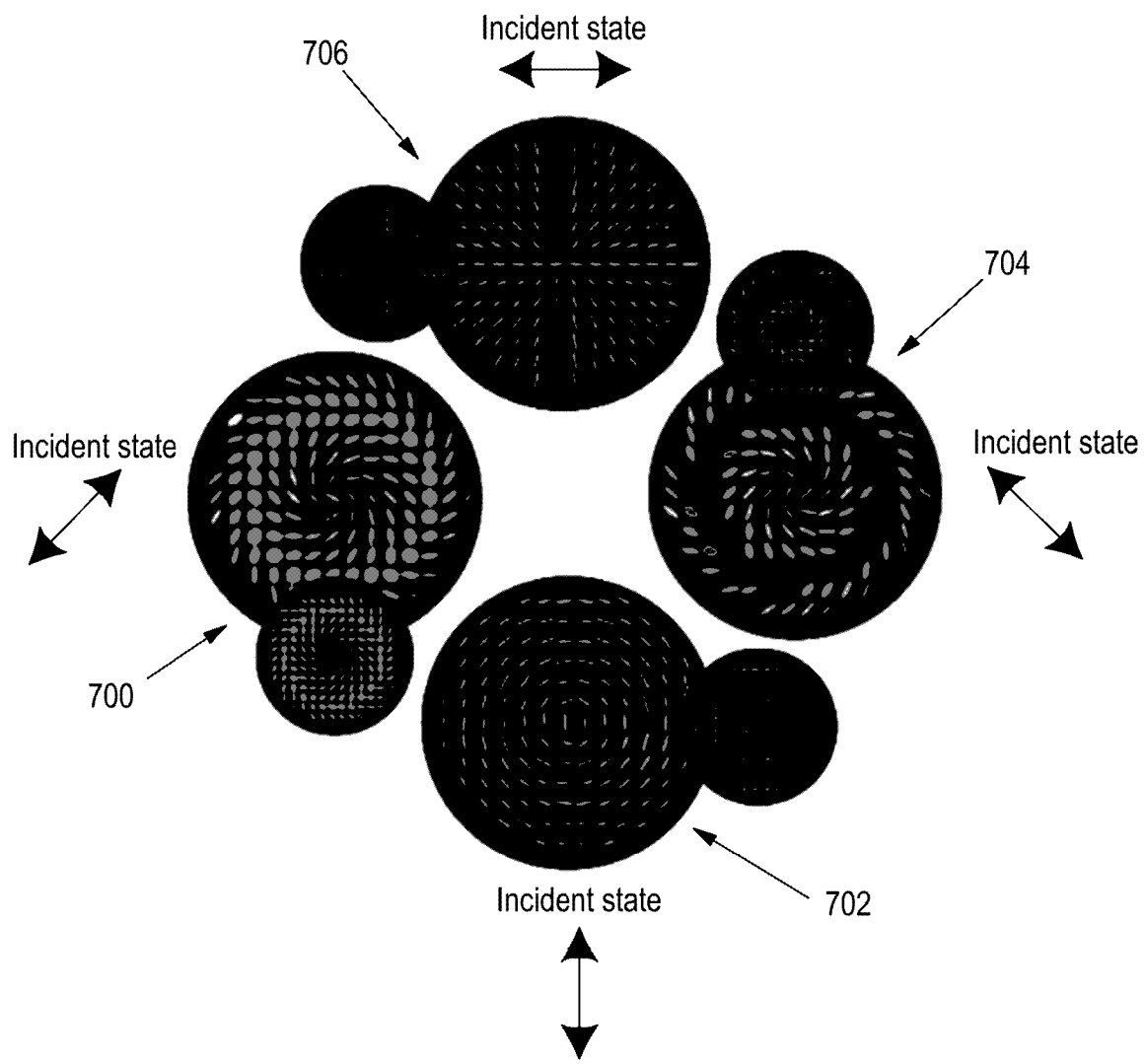
FIG. 7 shows experimental results and simulations showing the polarization states contained in various VVBs generated by an apparatus such as that illustrated in FIG. 5.

FIG. 7 shows experimental results and simulations corresponding to the polarization states contained in various vector vortex beams generated by a single GRIN lens transformation module having also a SHWP, i.e. using an apparatus such as that described above with reference to FIG. 5. Four incident polarization states are generated by the corresponding PSG, and the vector vortex beams are obtained after GRIN lens by the corresponding PSA.

Figure 6A:
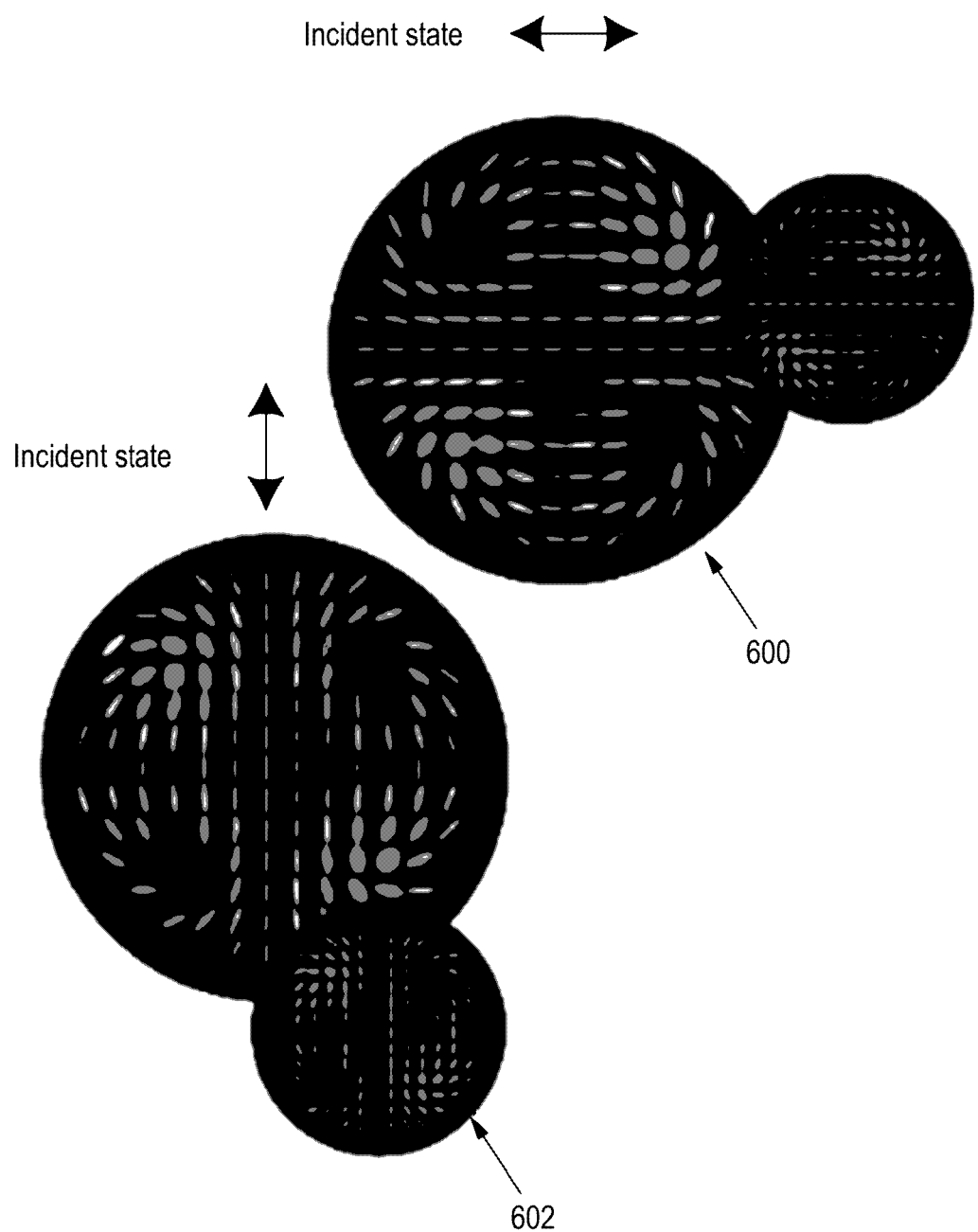
FIGS. 6a to 6e show experimental results and simulations showing the polarization states contained in various VVBs generated by an apparatus such as that illustrated in FIG. 4.
Figure 6B:
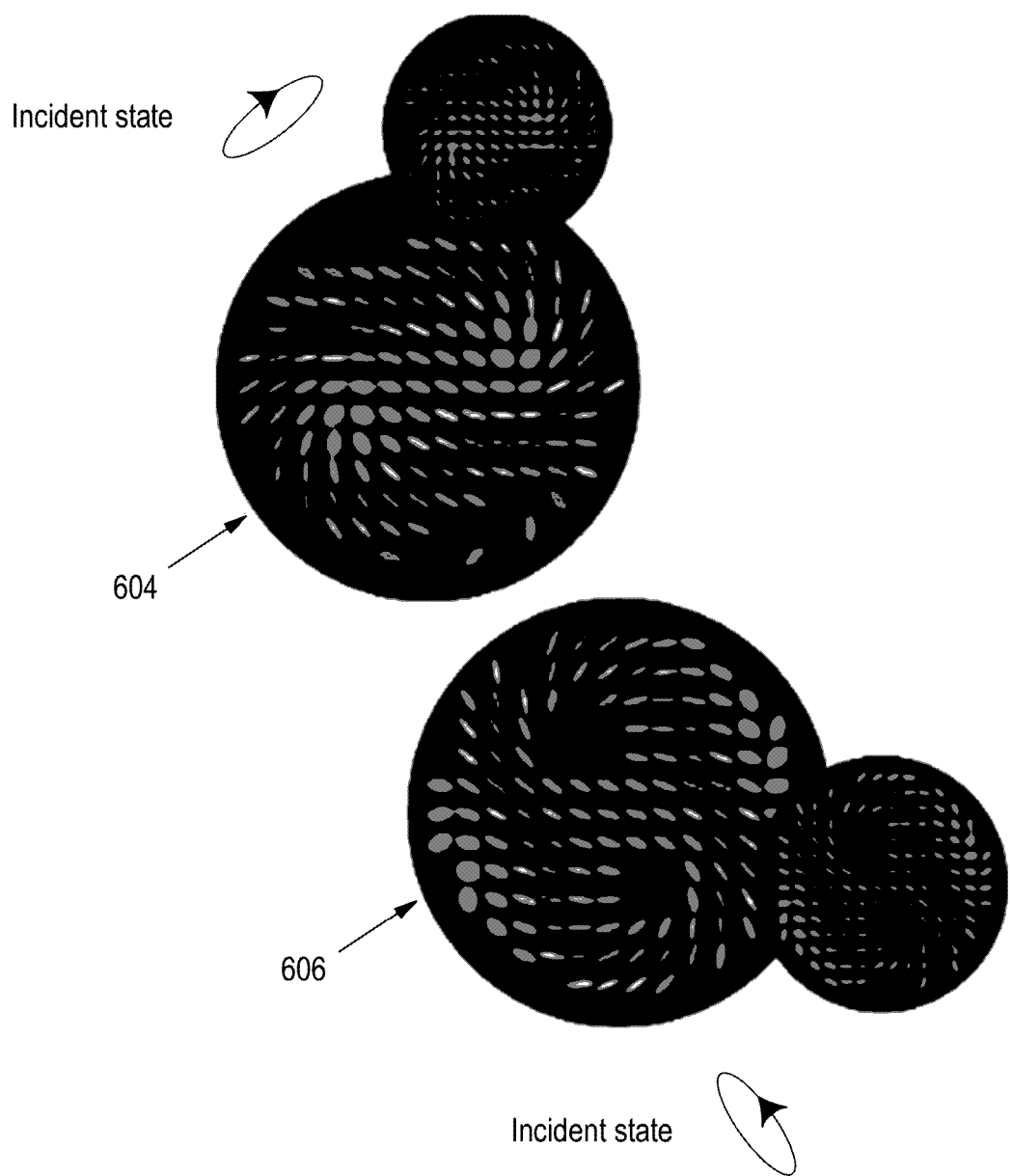
Figure 6C:
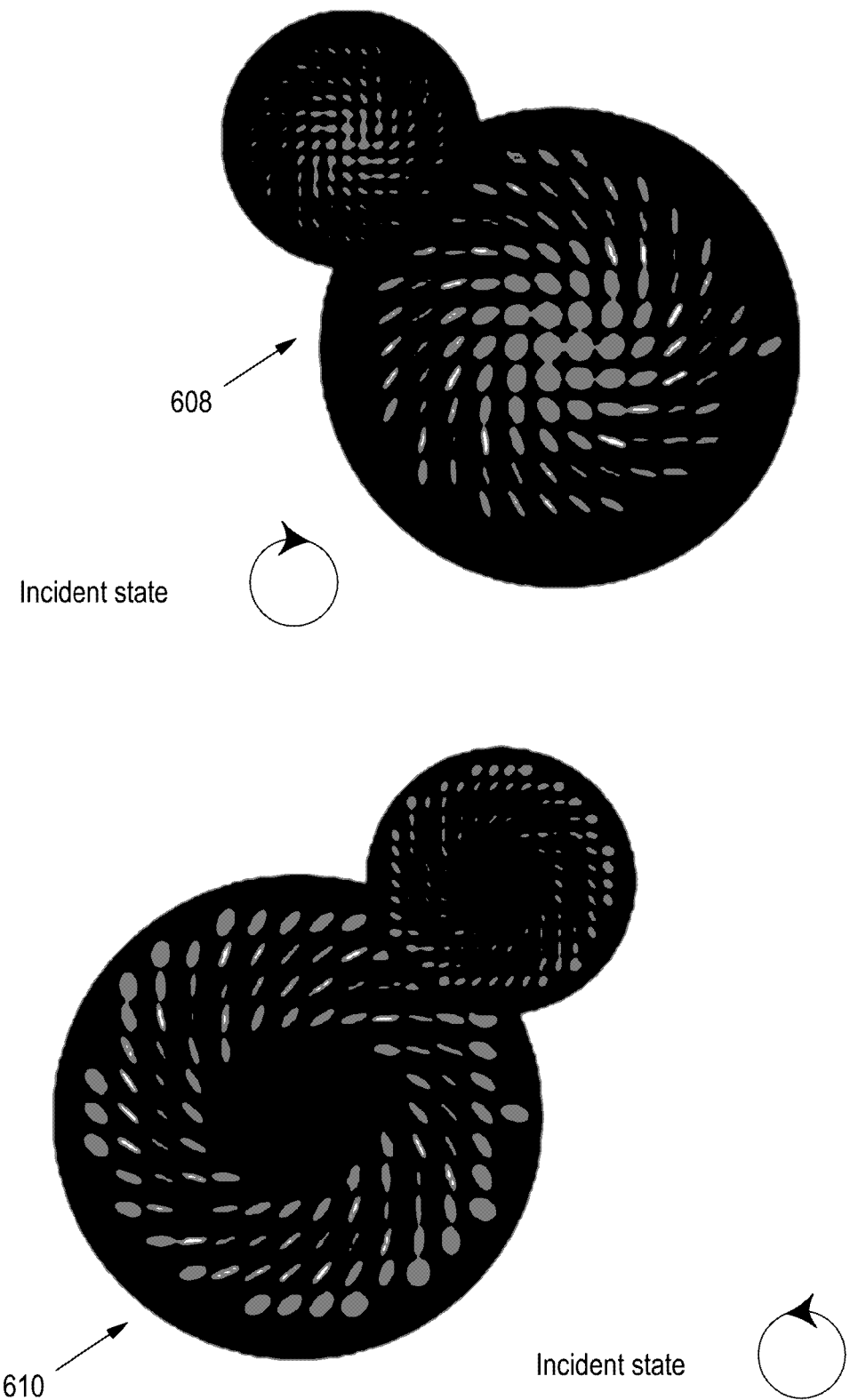
Figure 6D:
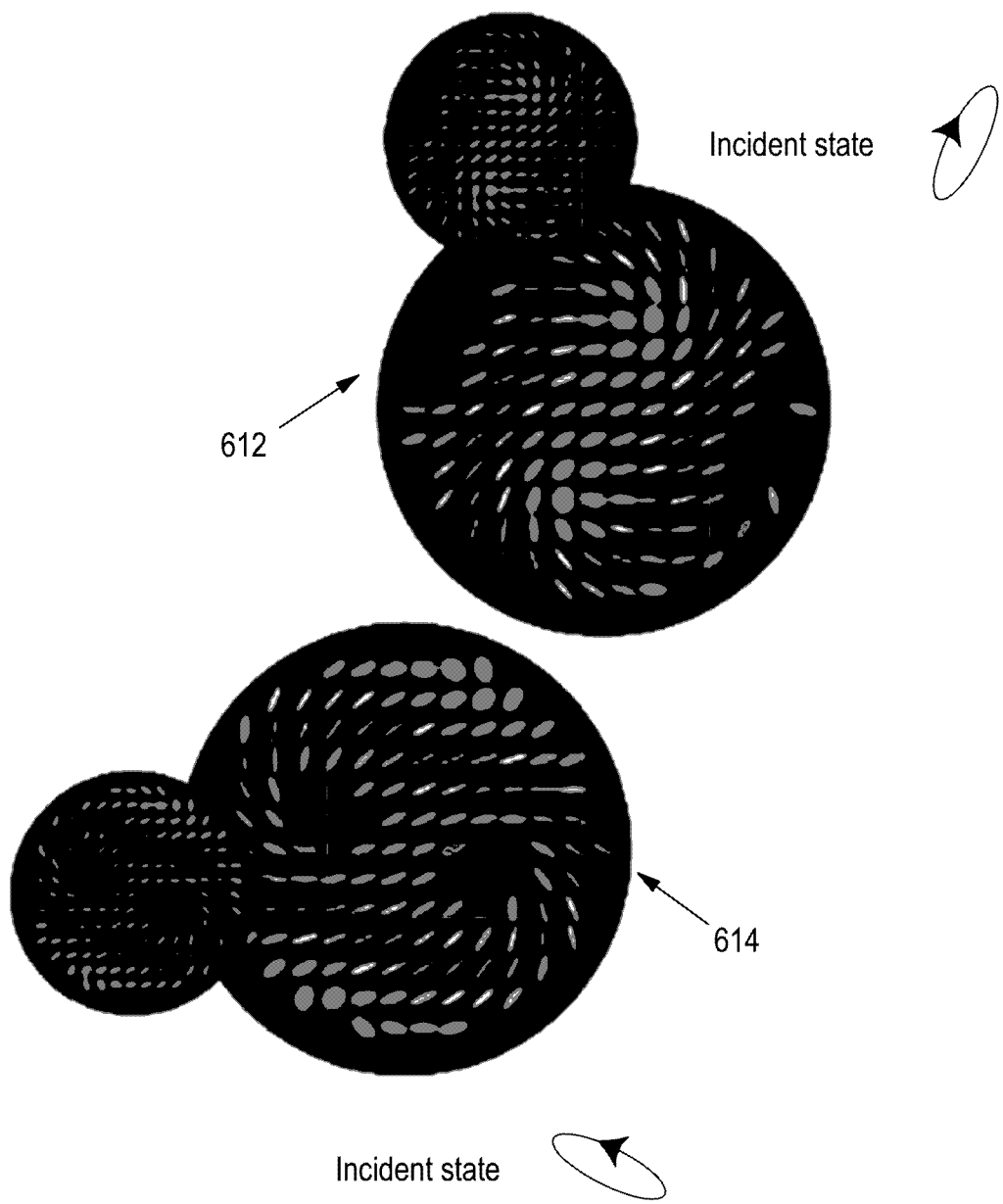
Figure 6E:
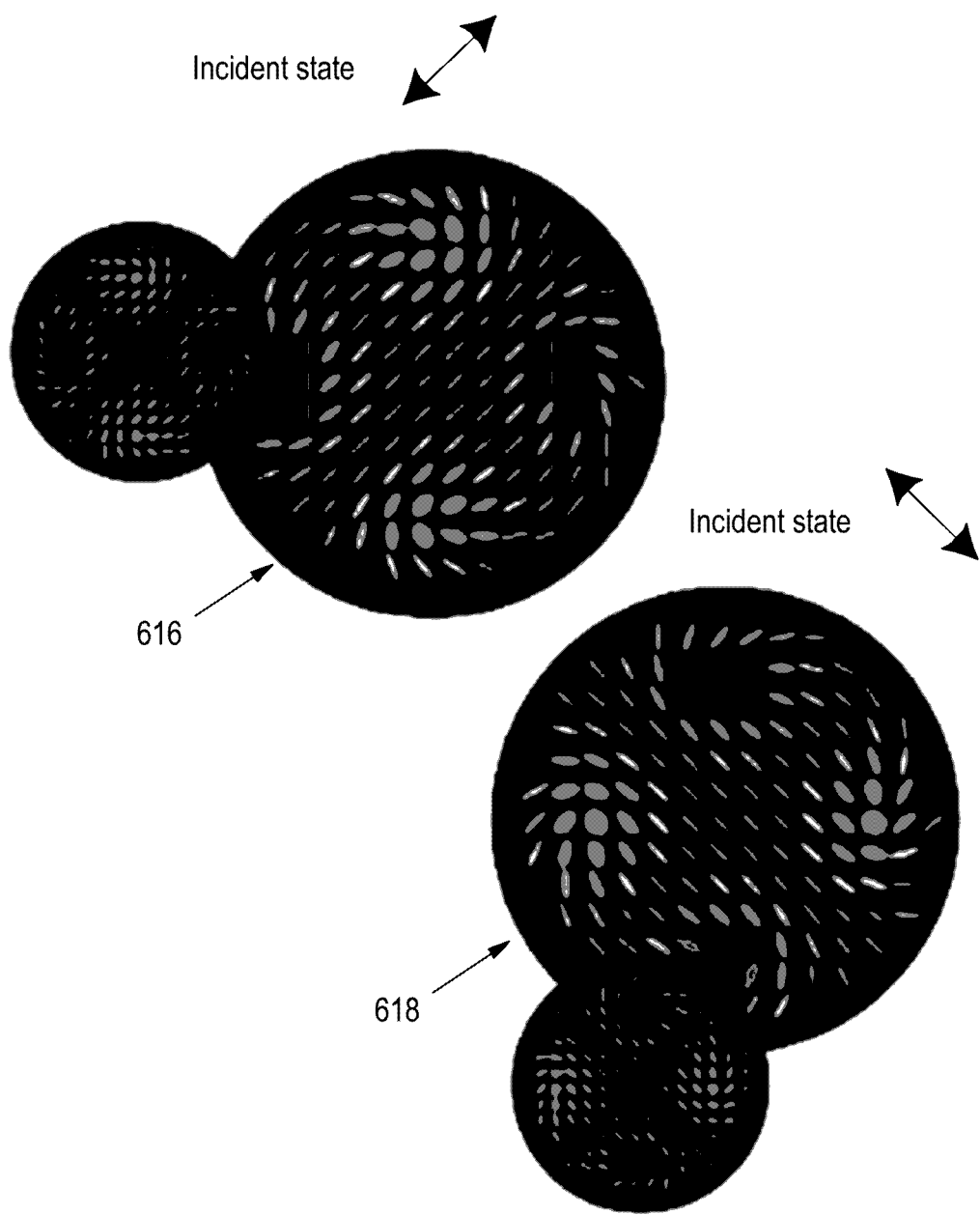
Figure 8:
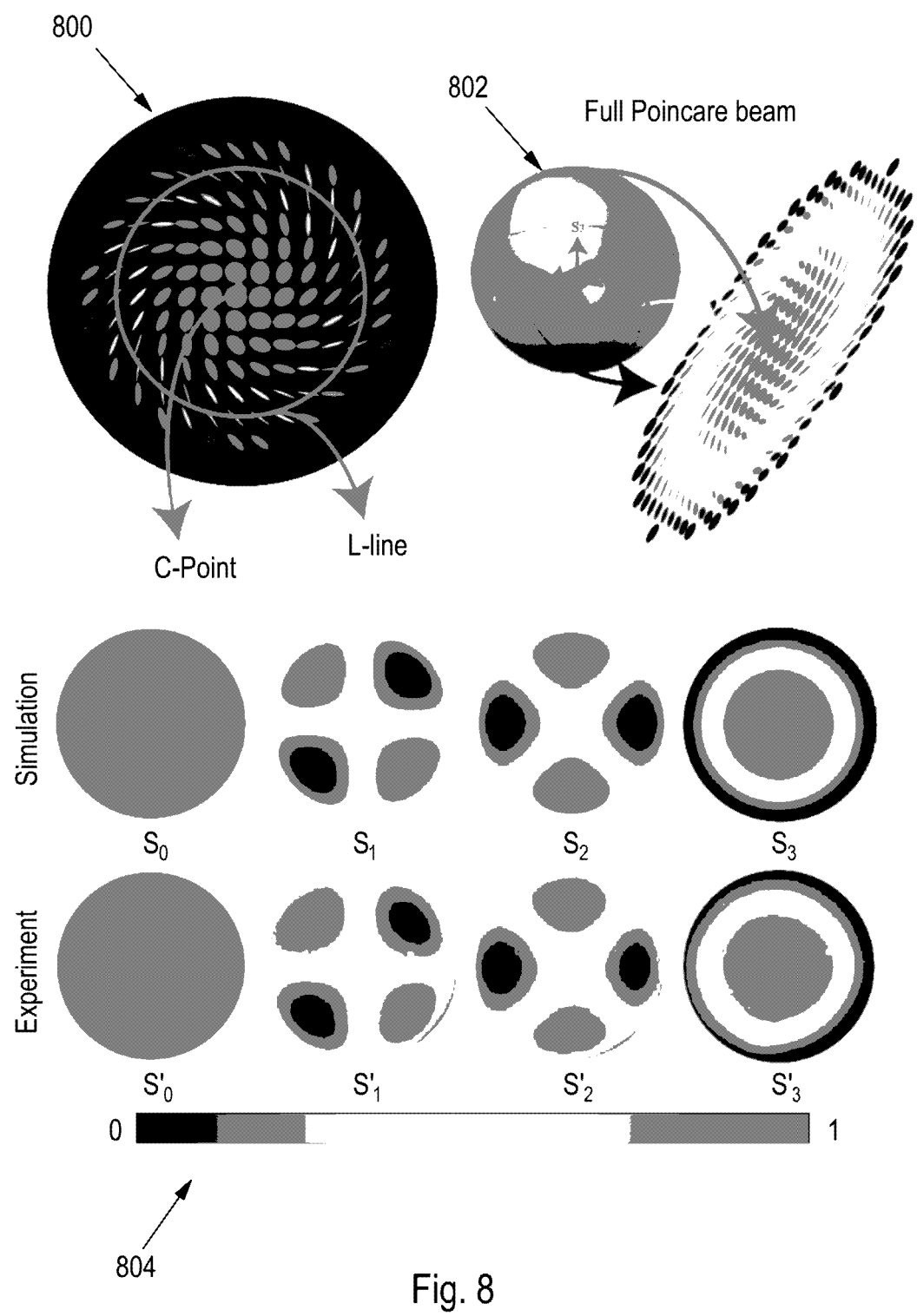
FIG. 8 is an analysis of an experimentally generated full Poincaré beam.

FIG. 8 shows an analysis of one full Poincaré beam 800 also shown as 608 in FIG. 6c. The C-point and L-line, as well as Poincaré sphere projection demonstration 802, validate the existence of a full Poincaré beam, i.e. all polarization states on the surface of the Poincaré sphere are present in the beam. The simulation (S0 to S3) and experimental results (S'0 to S'3) of the Stokes vectors of the full Poincaré beam are shown at 804 and demonstrate excellent correspondence. It should be appreciated that for any pure uniform incident polarization state incident, the single GRIN lens could generate a full Poincare beam. For example, if the single GRIN lens has a birefringence which can induce a retardance of at least π radians then a full Poincaré beam can be generated. Alternatively, two or more separate GRIN lenses which together provide a net retardance of at least π radians may be used.

FIGS. 9a to 9j show a number of further experimental results corresponding to the polarization states contained in vector vortex beams generated using apparatuses according to the present disclosure. The PSG and PSA are not shown in FIGS. 9a to 9j but the layout may be similar to that shown in FIG. 3, where different transformation modules are used. Panels (2) and (4) in each of FIGS. 9a to 9j show experimentally-measured polarization states of the vector vortex beams produced for horizontally polarized and right-hand circularly polarized input states respectively generated by the PSG. Panels (1) and (3) show corresponding simulated results for comparison purposes.

Figure 9B:
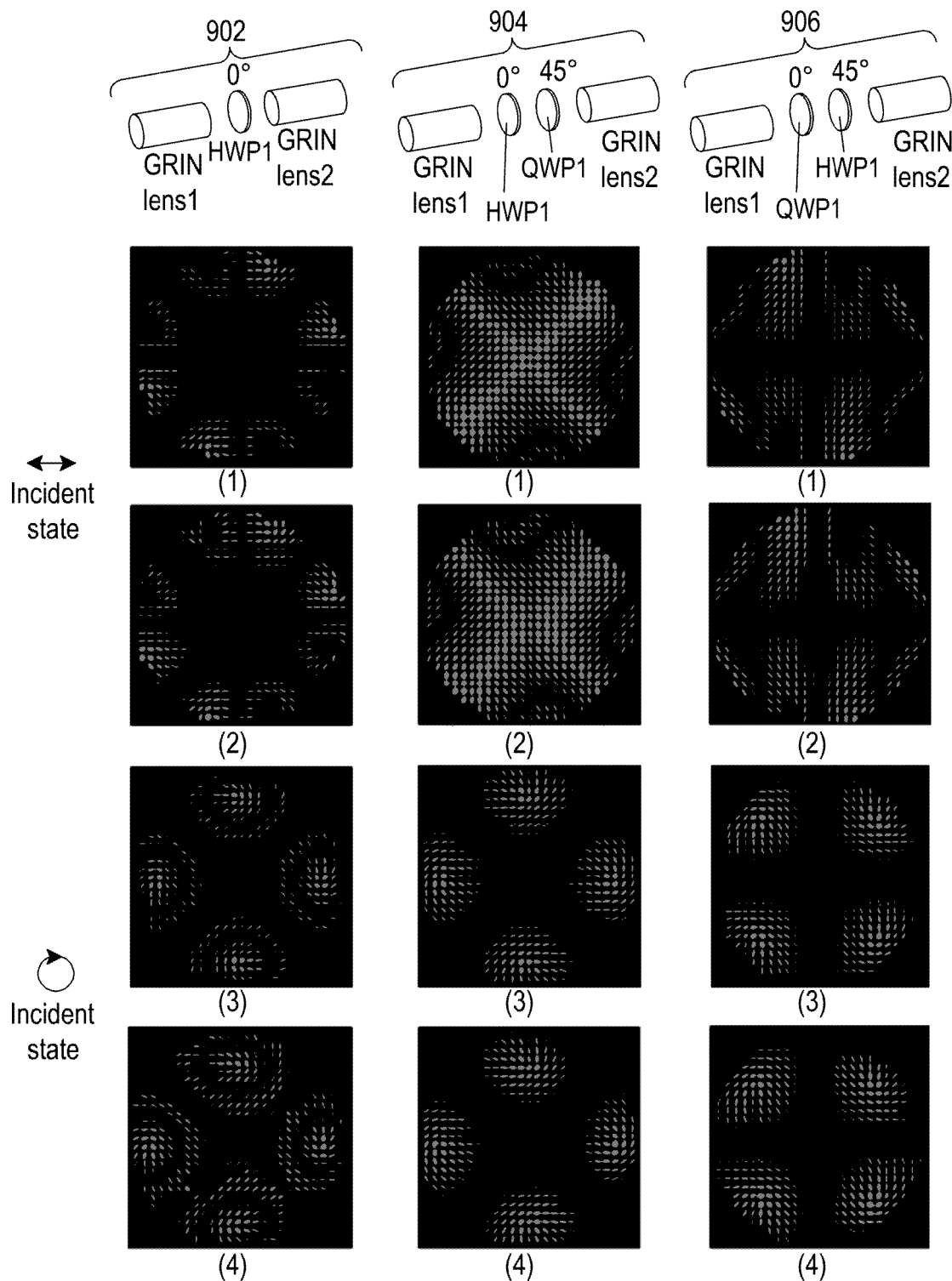
Figure 9C:
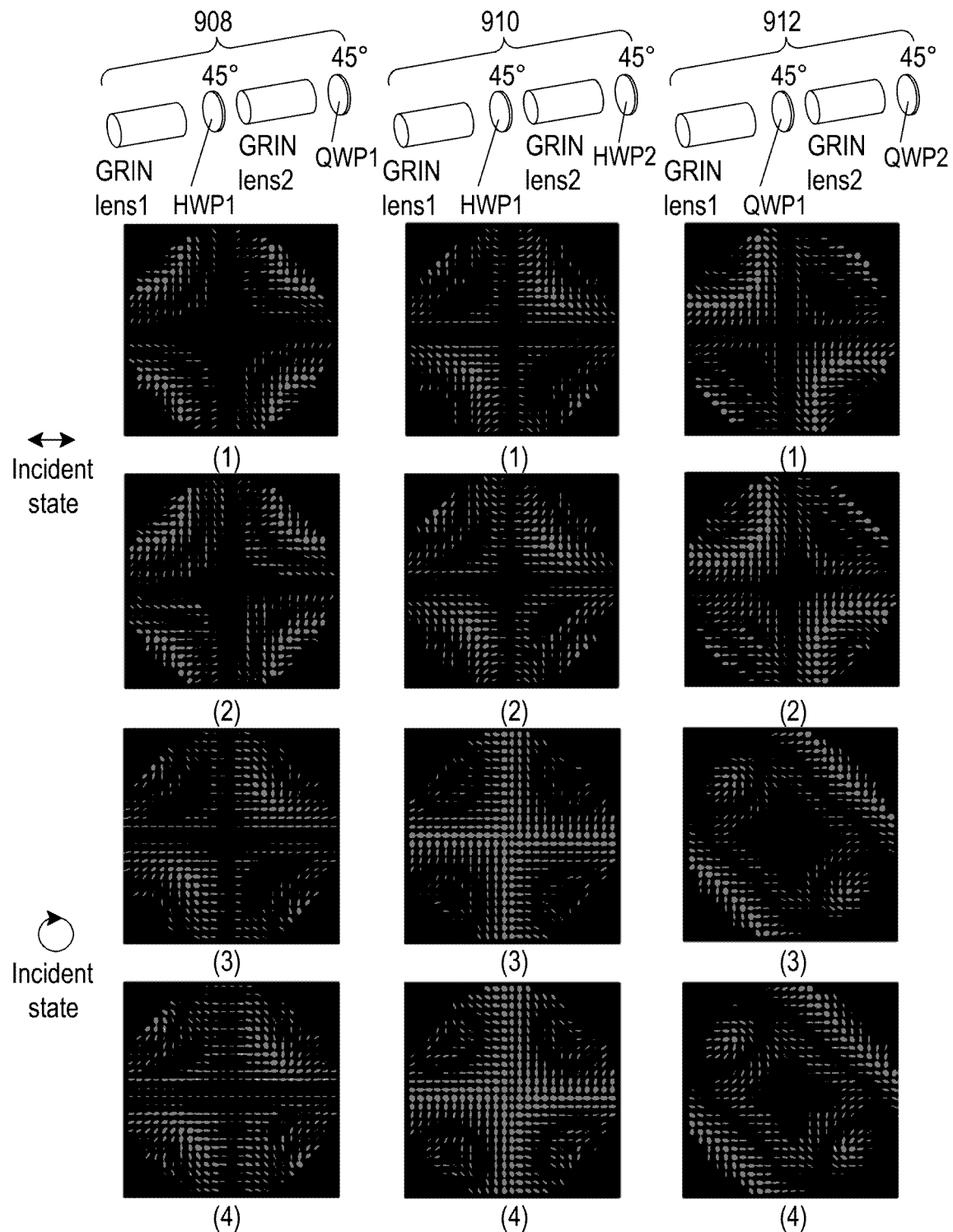
Figure 9D:
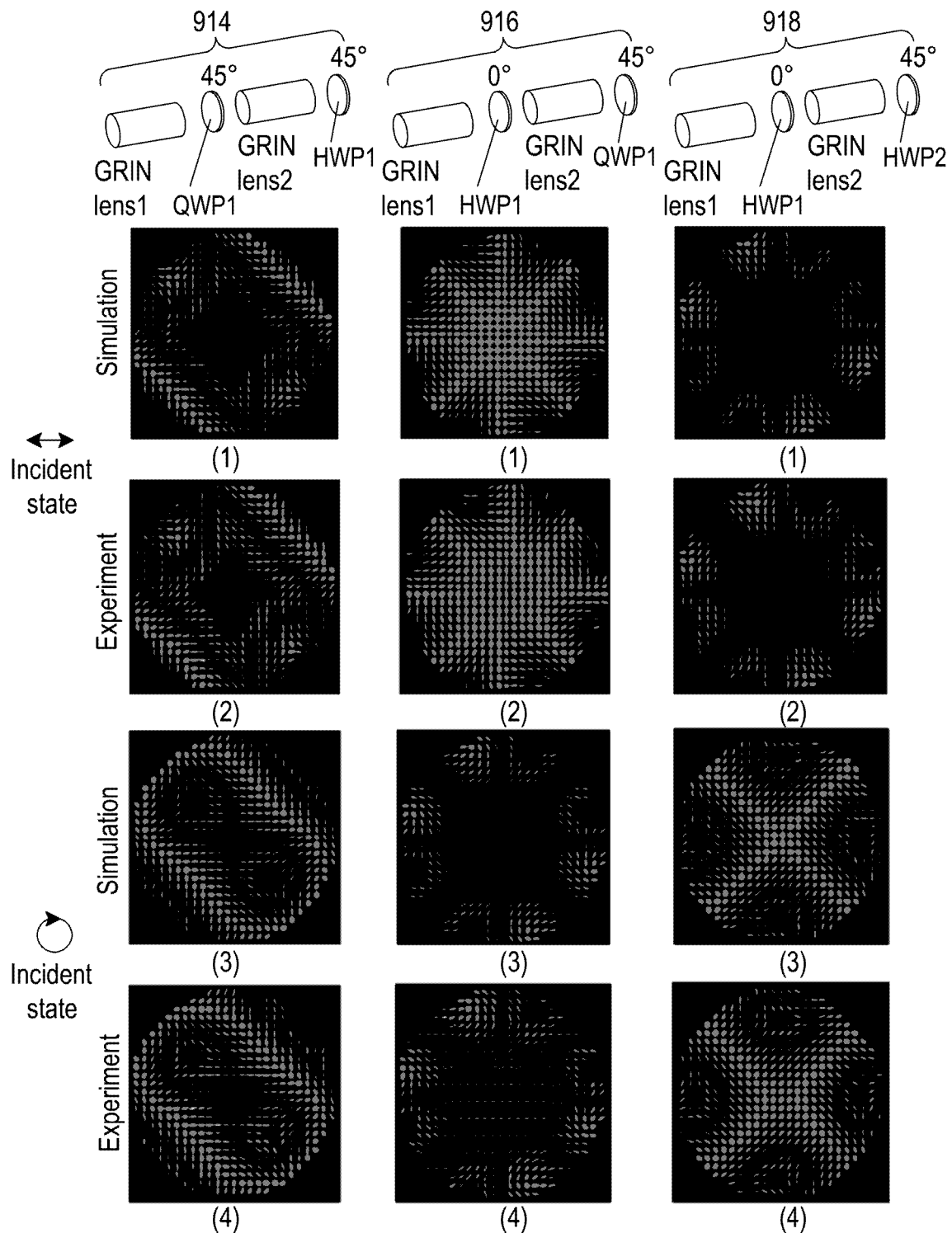
Figure 9E:
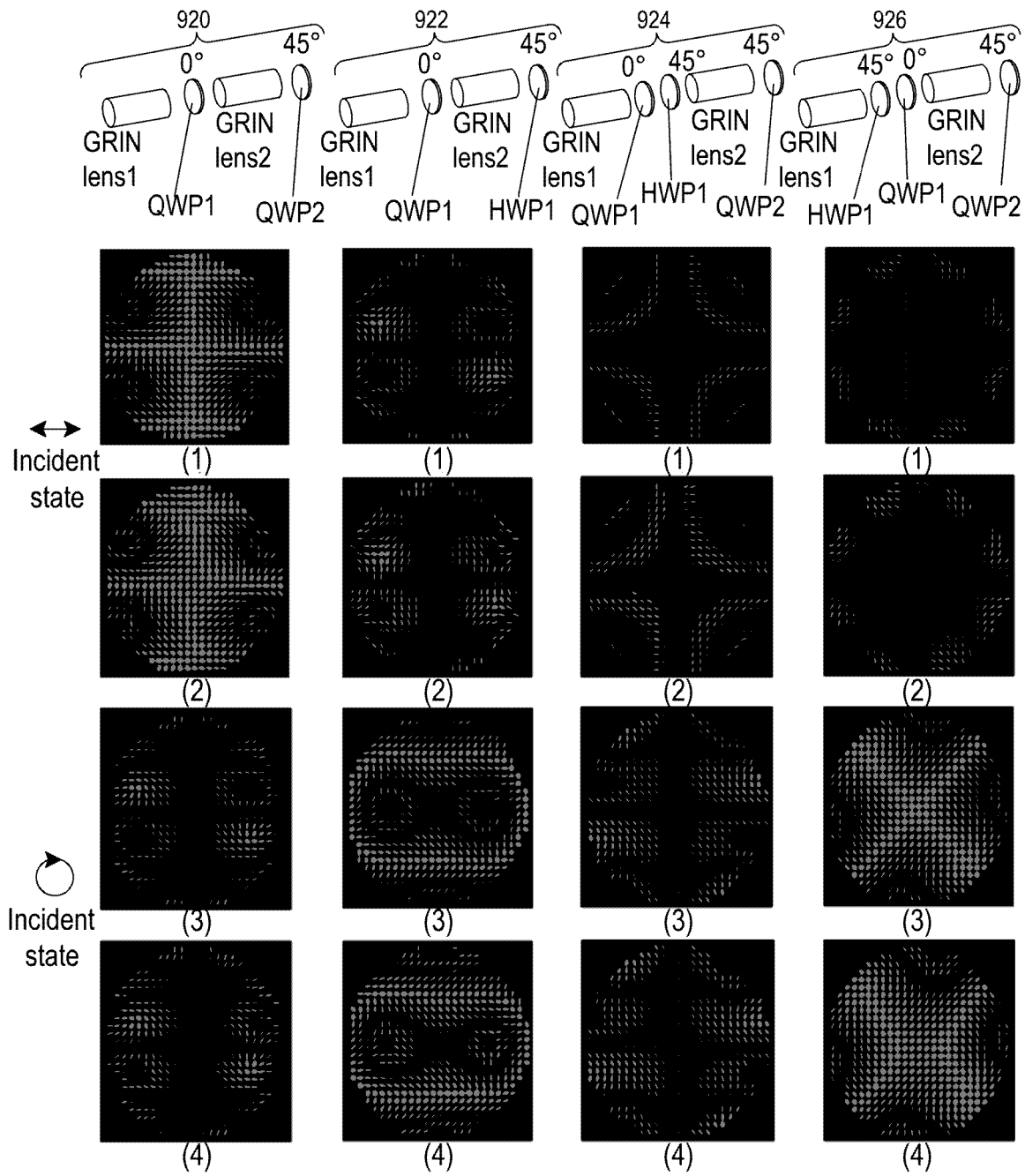
Figure 9F:
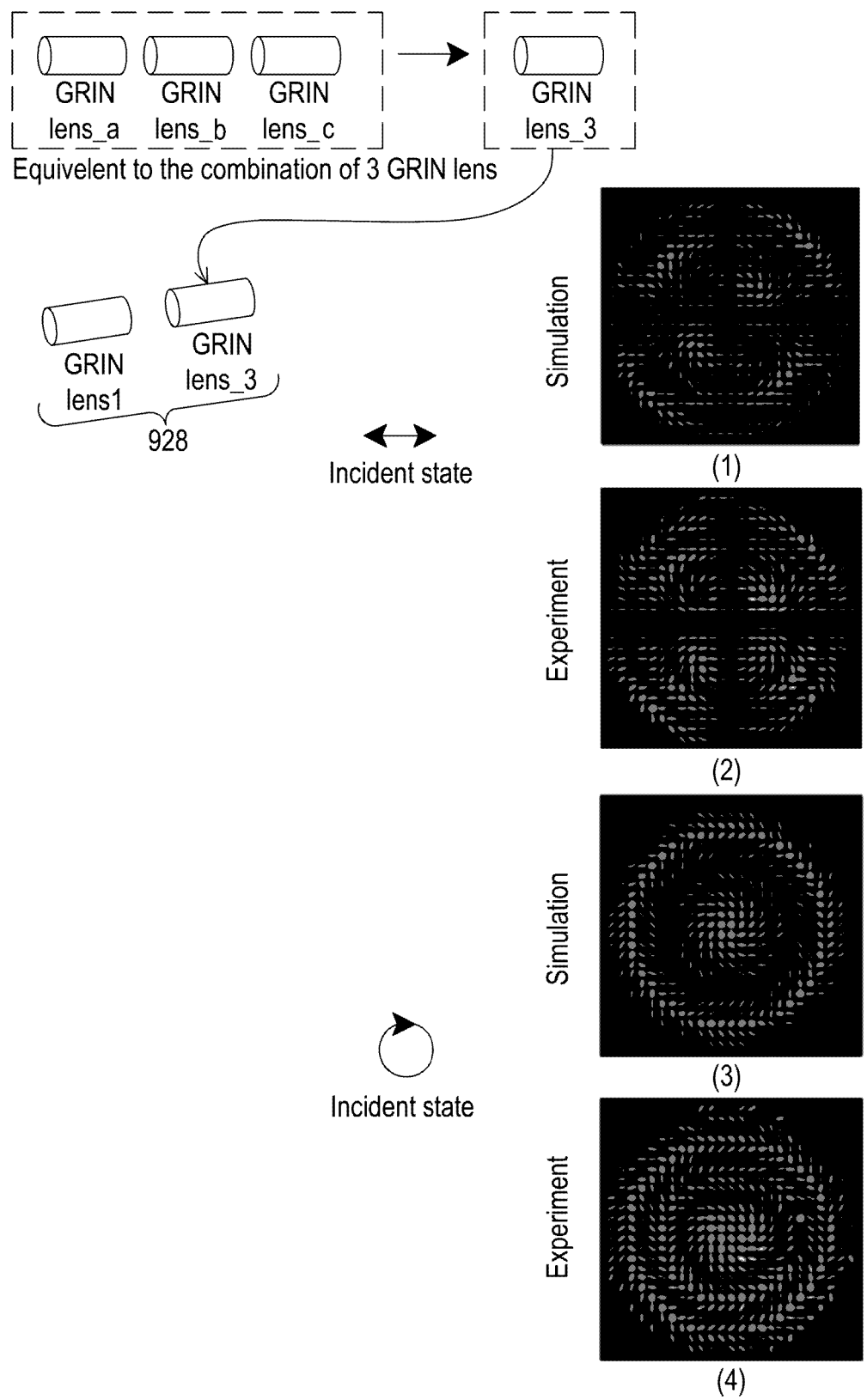
Figure 9G:
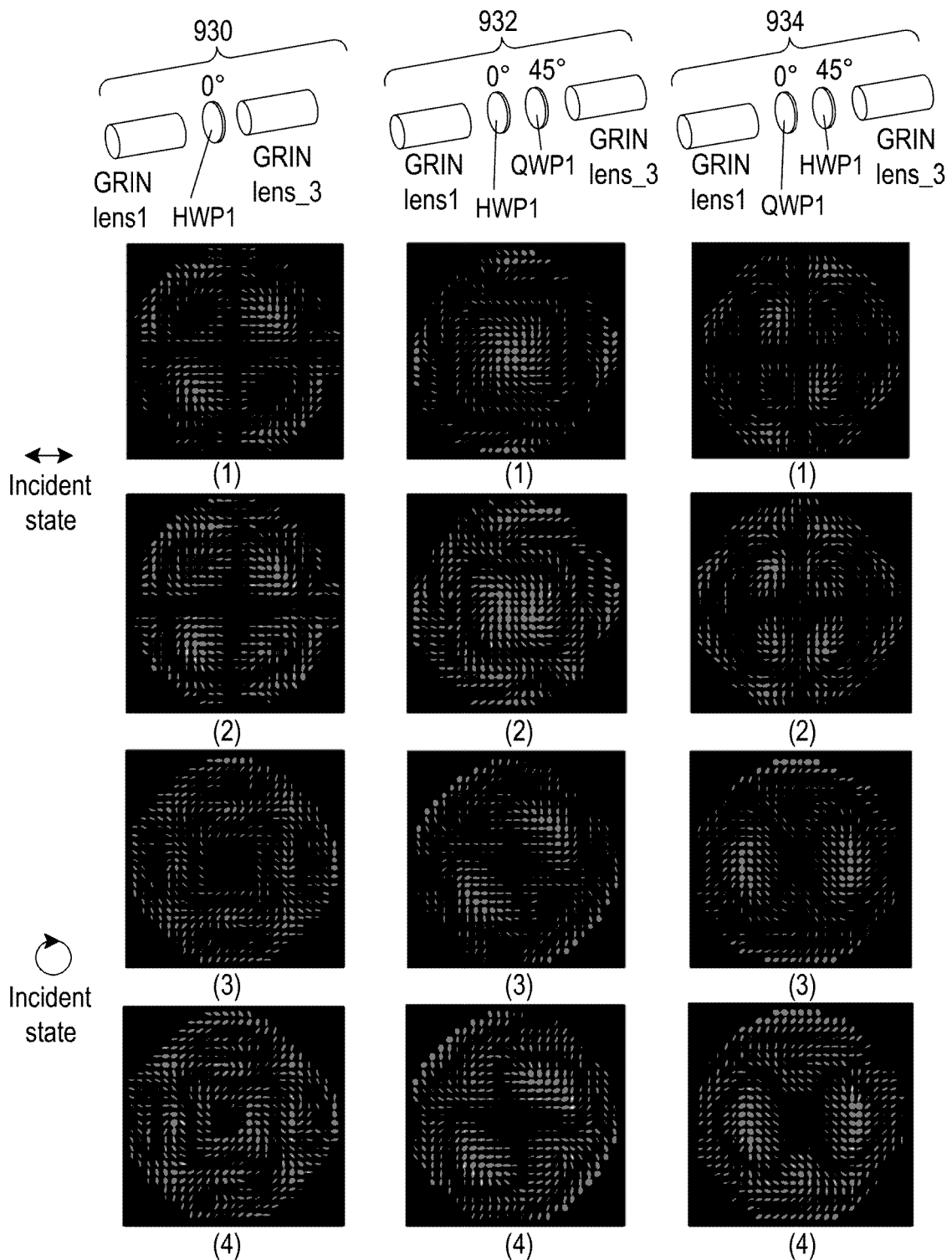
Figure 9H:
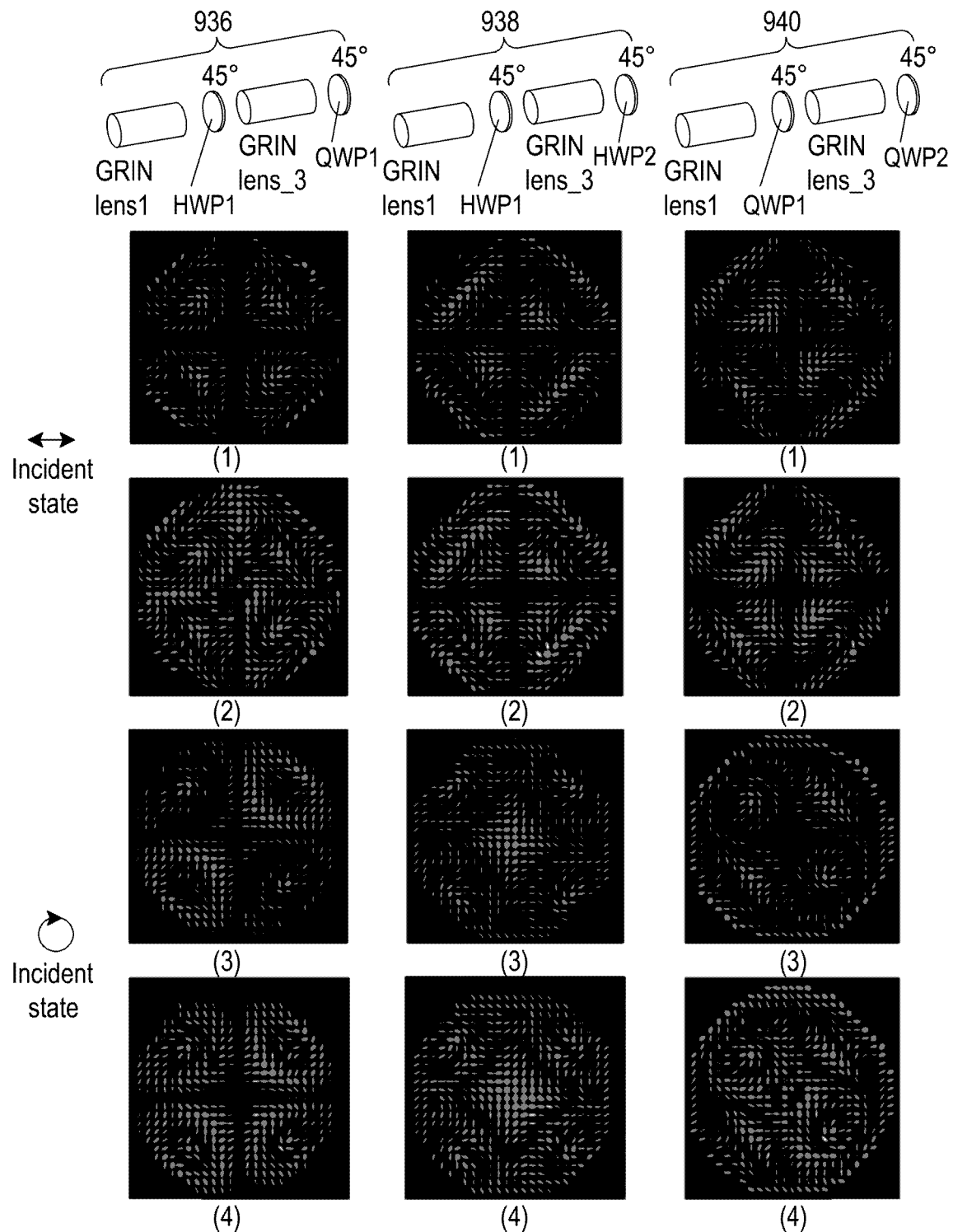
Figure 9I:
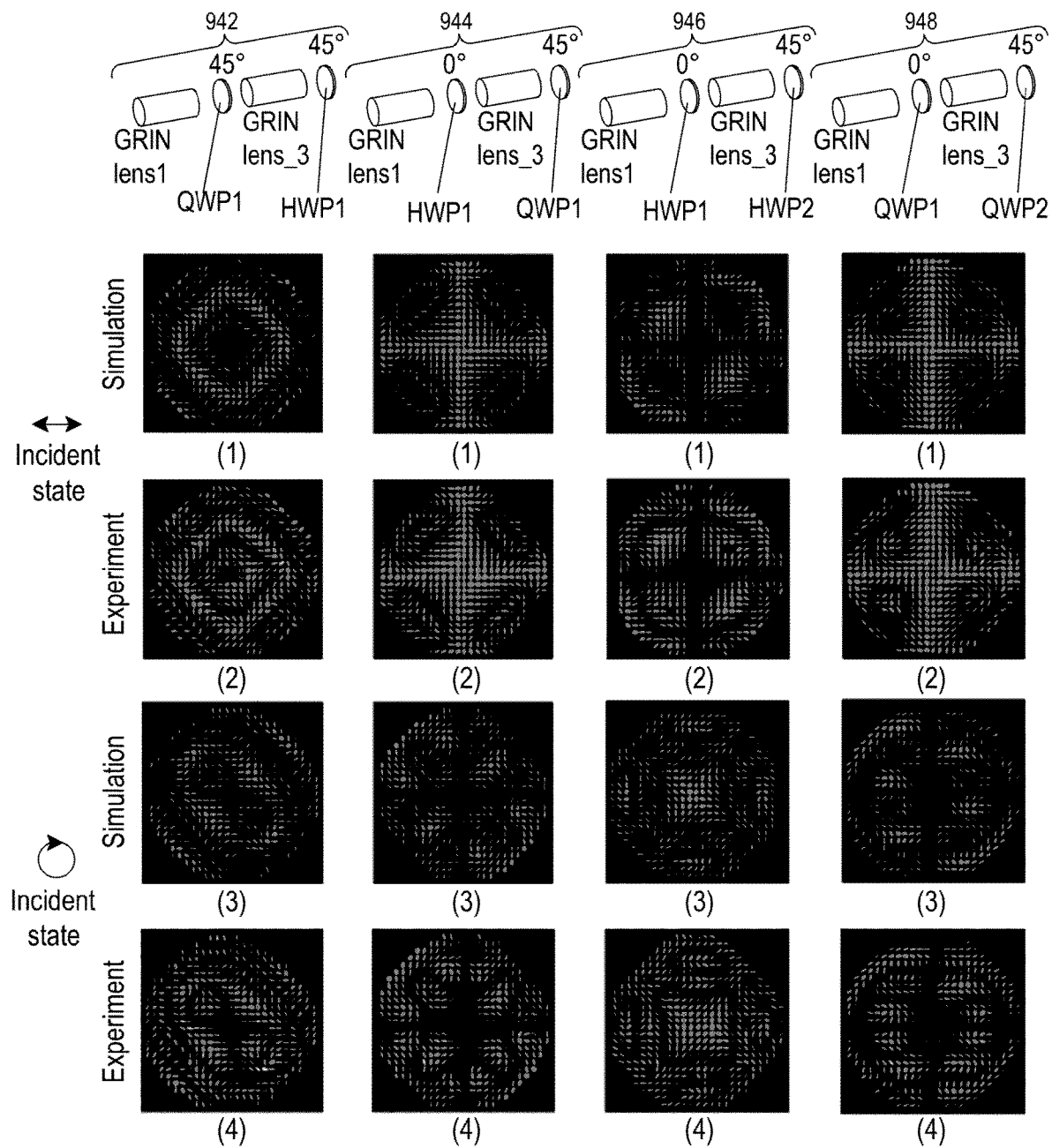
Figure 9J:
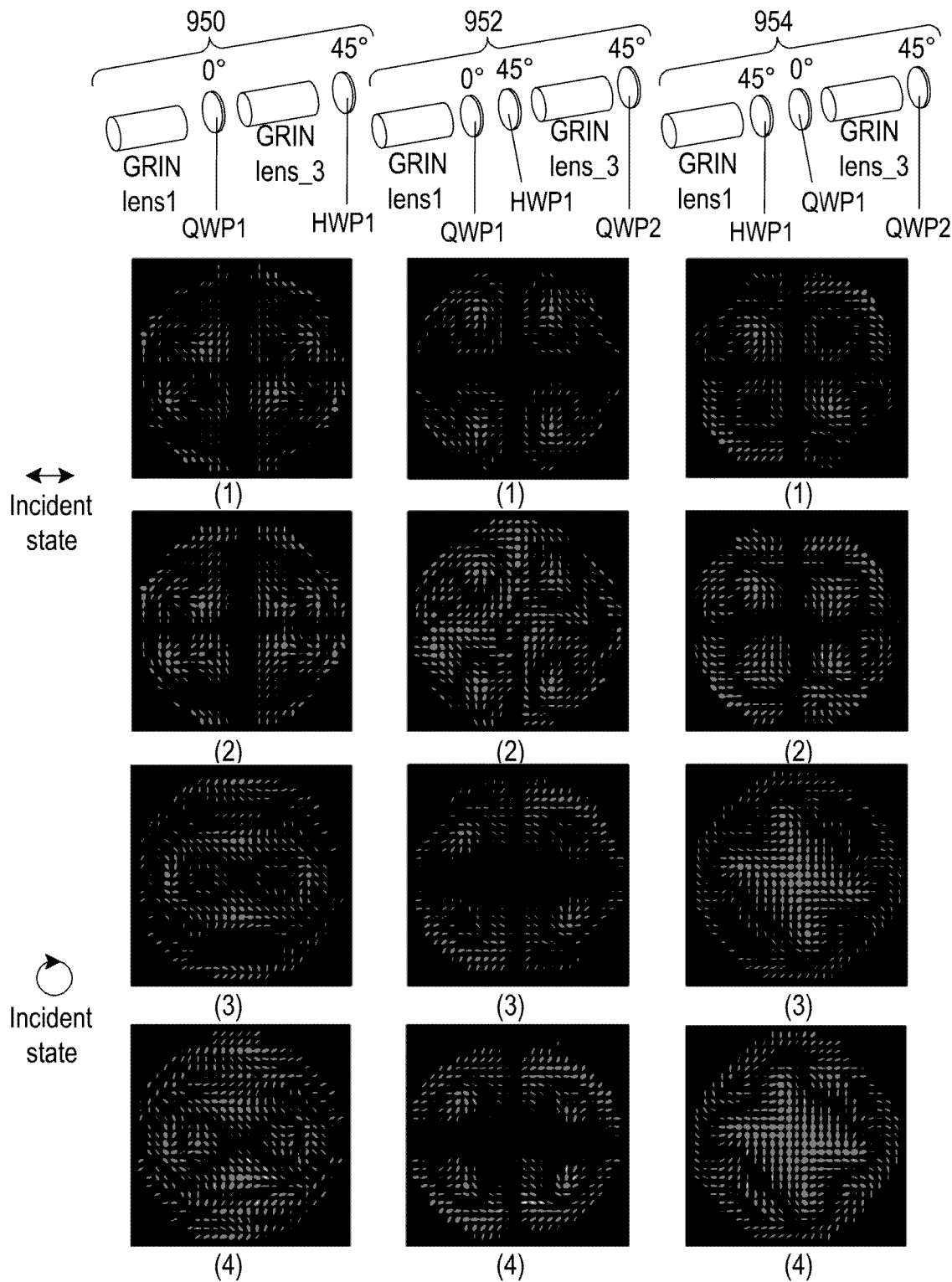

In FIG. 9a, a transformation module 900 consists of a pair of GRIN lenses in a cascade, where the two GRIN lenses have the same birefringence profile and, optionally, are separated by a gap, e.g. free-space gap. In FIG. 9b, transformation module 902 consists of a pair of similar or same birefringence GRIN lenses in a cascade with an interstitial component in the form of a half wave plate HWP1 with a fast axis orientation at 0 degrees to the horizontal. Transformation module 904 consists of a pair of similar or same birefringence GRIN lenses in a cascade with an interstitial component in the form of a half wave plate HWP1 with a fast axis orientation at 0 degrees to the horizontal followed by a quarter wave plate QWP1 with a fast axis orientation at 45 degrees to the horizontal. Transformation module 906 consists of a pair of similar or same birefringence GRIN lenses in a cascade with an interstitial component in the form of a quarter wave plate QWP1 with a fast axis orientation at 45 degrees to the horizontal followed by a half wave plate HWP1 with a fast axis orientation at 0 degrees to the horizontal. In FIG. 9c, transformation module 908 consists of a pair of similar or same birefringence GRIN lenses in a cascade with an interstitial component in the form of a half wave plate HWP1 with a fast axis orientation at 45 degrees to the horizontal between the two GRIN lenses of the cascade followed by a quarter wave plate QWP1 with a fast axis orientation at 45 degrees to the horizontal after the second grin lens in the cascade. Transformation module 910 consists of a pair of similar or same birefringence GRIN lenses in a cascade with an interstitial component in the form of a half wave plate HWP1 with a fast axis orientation at 45 degrees to the horizontal between the two GRIN lenses of the cascade followed by a second half wave plate HWP2 with a fast axis orientation at 45 degrees to the horizontal after the second grin lens in the cascade. Transformation module 912 consists of a pair of similar or same birefringence GRIN lenses in a cascade with an interstitial component in the form of a quarter wave plate QWP1 with a fast axis orientation at 45 degrees to the horizontal between the two GRIN lenses of the cascade followed by a second quarter wave plate QWP2 with a fast axis orientation at 45 degrees to the horizontal after the second grin lens in the cascade. In FIG. 9d, transformation module 914 consists of a pair of similar or same birefringence GRIN lenses in a cascade with an interstitial component in the form of a quarter wave plate QWP1 with a fast axis orientation at 45 degrees to the horizontal between the two GRIN lenses of the cascade followed by a half wave plate HWP1 with a fast axis orientation at 45 degrees to the horizontal after the second grin lens in the cascade. Transformation module 916 consists of a pair of similar or same birefringence GRIN lenses in a cascade with an interstitial component in the form of a half wave plate HWP1 with a fast axis orientation at 0 degrees to the horizontal between the two GRIN lenses of the cascade followed by a quarter wave plate QWP1 with a fast axis orientation at 45 degrees to the horizontal after the second grin lens in the cascade. Transformation module 918 consists of a pair of similar or same birefringence GRIN lenses in a cascade with an interstitial component in the form of a half wave plate HWP1 with a fast axis orientation at 0 degrees to the horizontal between the two GRIN lenses of the cascade followed by a second half wave plate HWP2 with a fast axis orientation at 45 degrees to the horizontal after the second grin lens in the cascade. In FIG. 9e, transformation module 920 consists of a pair of similar or same birefringence GRIN lenses in a cascade with an interstitial component in the form of a quarter wave plate QWP1 with a fast axis orientation at 0 degrees to the horizontal between the two GRIN lenses of the cascade followed by a second quarter wave plate QWP2 with a fast axis orientation at 45 degrees to the horizontal after the second grin lens in the cascade. Transformation module 922 consists of a pair of similar or same birefringence GRIN lenses in a cascade with an interstitial component in the form of a quarter wave plate QWP1 with a fast axis orientation at 0 degrees to the horizontal between the two GRIN lenses of the cascade followed by a half wave plate HWP1 with a fast axis orientation at 45 degrees to the horizontal after the second grin lens in the cascade. Transformation module 924 consists of a pair of similar or same birefringence GRIN lenses in a cascade with interstitial components in the form of a quarter wave plate QWP1 with a fast axis orientation at 0 degrees to the horizontal followed by a half wave plate HWP1 with a fast axis at 45 degrees to the horizontal between the two GRIN lenses of the cascade followed by a second quarter wave plate QWP2 with a fast axis orientation at 45 degrees to the horizontal after the second grin lens in the cascade. Transformation module 926 consists of a pair of similar same birefringence GRIN lenses in a cascade with interstitial components in the form of a half wave plate HWP1 with a fast axis orientation at 45 degrees to the horizontal followed by a quarter wave plate QWP1 with a fast axis at 0 degrees to the horizontal between the two GRIN lenses of the cascade followed by a second quarter wave plate QWP2 with a fast axis orientation at 45 degrees to the horizontal after the second grin lens in the cascade.

In FIGS. 9f to 9j the second GRIN lens in the cascade of GRIN lenses has a length three times greater than the first GRIN lens in the cascade of GRIN lenses. Thus transformation module 928 consists of a pair of GRIN lenses in a cascade with no interstitial components where the second GRIN lens' birefringence value is around three times greater than that of the first GRIN lens. Transformation modules 930, 932, 934, 936, 938, 940, 942, 944, 946, 948, 950, 952 and 954 are similar to transformation modules 902, 904, 906, 908, 910, 912, 914, 916, 918, 920, 922, 924 and 926 respectively except that the second GRIN lens in the cascade of GRIN lenses has a birefringence value that is around three times greater than that of the first GRIN lens. It should be appreciated that the birefringence profile of the second GRIN lens could alternatively be any integer (or non-integer) multiple of the birefringence level of the first GRIN lens, or any birefringence profile in between.

Figure 10:
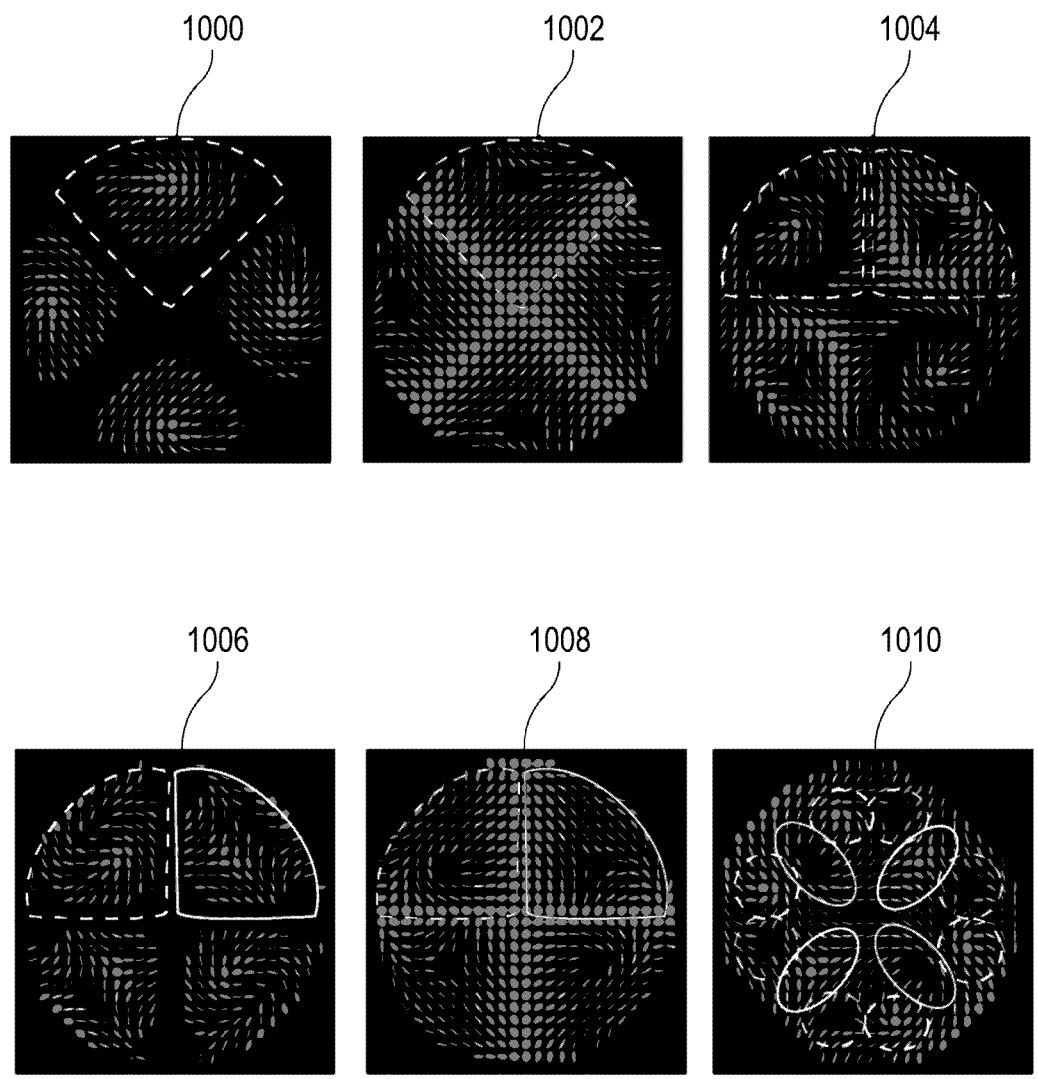
FIG. 10 is a selection of six generated polarization patterns corresponding to experimentally generated vector vortex beams.

FIG. 10 shows a selection of six generated polarization patterns for further analysis taken from the results presented in FIGS. 9a to 9j. Specifically, pattern 1000 corresponds to the pattern generated by the transformation module 902 for a right hand circular incident polarization state, 1002 corresponds to the pattern generated by transformation module 918 for a right hand circular incident polarization state, pattern 1004 corresponds to the pattern generated by the transformation module 936 for a right hand circular incident polarization state, pattern 1006 corresponds to the pattern generated by transformation module 936 for a horizontal incident polarization state, pattern 1008 corresponds to the pattern generated by transformation module 948 for a horizontal incident polarization state and finally pattern 1010 corresponds to the pattern generated by transformation module 944 for a right hand circular incident polarization state. From patterns 1000 and 1002 it is evident that the GRIN lens based cascade transformation module is able to generate multiple Full Poincaré beam units within the single beam (each could have 4 units under those structures, see white and green dotted triangle to selected one unit) in a single-beam. The beams represented by patterns 1000 and 1002 also have opposite topological charge. In pattern 1004 there are two pairs of full Poincaré beams with opposite topological charge within a single overall beam (white and green dotted line show one pair) and opposite handedness on the corresponding topological charge units. In patterns 1006 and 1008 there are multiple full Poincaré beams with opposite topological charge but same handedness on the corresponding topological charge units in a single-beam (white solid and dotted lines in 1006 and green counterparts in 1008). In 1006 there are actually 2 basic topological units in one full Poincaré beam but in 1008 there is only one. This reveals that the GRIN lens based structure is able to modulate different kinds of full Poincaré beam. Pattern 1010 demonstrates not only that multi full Poincaré beam units can be generated, but also that the beam could have multi same/opposite topological charge units and multi same/opposite handedness beam units simultaneously (white circles have same handedness but could find opposite topologic charges pairs in solid and dotted circles, green circles have opposite handedness compared with the one in white circles, and could find opposite topologic charges pairs in their own solid and dotted circles). All of these characteristics indicate that the various special vector vortex beams generated by transformation modules having GRIN lens cascade structure according to the present disclosure open a new window for fundamental polarization light field research as well as further complex polarization coding/engineering.

Orbital Angular Momentum Beam Generation

The above section detailed the generation of VVBs which may contain OAM and where the polarization state is also inhomogeneous, i.e. contains structure such as a full Poincaré beam. This section is concerned with generation of OAM beams which do not have the inhomogeneous polarization structure of the above VVB beams but still contain orbital angular momentum. It has also been appreciated by the inventor that transformation modules comprising one or more GRIN lenses in a cascade structure as disclosed herein are capable of producing beams having orbital angular momentum, OAM. A light beam with a helical phase-front, described by an azimuthal phase structure of the form $e^{im\partial}$ carries OAM equivalent to mh per photon.

Consider the state of polarization used in the system, presenting as a eigenbasis $$E_L = \frac{1}{\sqrt{2}}[1, -i]^T, E_R = \frac{1}{\sqrt{2}}[1, i]^T.$$

Assume, for example, that an incident polarization state $$E_R = \frac{1}{\sqrt{2}}[1, i]^T$$

is generated by the polarization state generator 402 of the arrangement 400 shown in FIG. 4 (described above). After propagating through the transformation module 404 consisting of the single GRIN lens 408 the polarization state becomes:

$$J_{GRIN} E_R = z_1 E_R + z_2 E_L = J_{GRIN}\begin{bmatrix}1\\i\end{bmatrix} = z_1\begin{bmatrix}1\\i\end{bmatrix} + z_2\begin{bmatrix}1\\-i\end{bmatrix} \quad (2)$$

where $J_{GRIN}$ is the Jones matrix of the GRIN lens given by equation (1) above. Using the Jones matrix yields expressions $[z_1, z_2]$ in equation (2) above can be written as $z_1 = \frac{1}{2}(e^{i0} + e^{i\sigma})$, $z_2 = \frac{1}{2}(e^{i(2\theta+\pi)} + e^{i(2\theta+\sigma)})$, Accordingly, if the PSA 406 of the arrangement of FIG. 4 is arranged to select left-hand polarized light when having $$E_R = \frac{1}{\sqrt{2}}[1, i]^T$$

incident, in equation (2) only the $z_2 E_L$ part would remain at the output of the PSA 406, which is given by:

$$z_2 E_L = \frac{1}{2}(e^{i(2\theta+\pi)} + e^{i(2\theta+\sigma)})\begin{bmatrix}1\\-i\end{bmatrix} \quad (3)$$

$$= A e^{i(2\theta+\varphi)}\begin{bmatrix}1\\-i\end{bmatrix}$$

Since OAM is only related to the phase profile of the beam, the intensity pre-factor A in equation (3) can be disregarded for the purposes of this analysis. Equation (3) reveals a phase factor given by i(2θ+φ), φ could be considered as corresponding to an initial phase delay determined by a which is fixed when a GRIN lens is manufactured. The i2θ part shows that the analysed beam $z_2 E_L$ carries 2 units of OAM, which reveals the GRIN lens can be used as an OAM generator as well as having the ability to be a spin to orbital angular momentum converter.

Experimental results were obtained to demonstrate the ability of the apparatus 400 shown in FIG. 4 to generate orbital angular momentum. The incident polarization state generated by the PSG 402 was fixed at right-hand circular, i.e. a spin state which carries spin angular momentum. Different analysis states were used to obtain corresponding wave front information. Specifically, by rotating the second quarter wave plate QWP2 located in the PSA section 406 of apparatus 400, whilst keeping the other polarization manipulating components fixed, a pathway of changing analysis polarization states from i to ix was obtained, as illustrated on the Poincaré sphere of FIG. 11.

Figure 11:
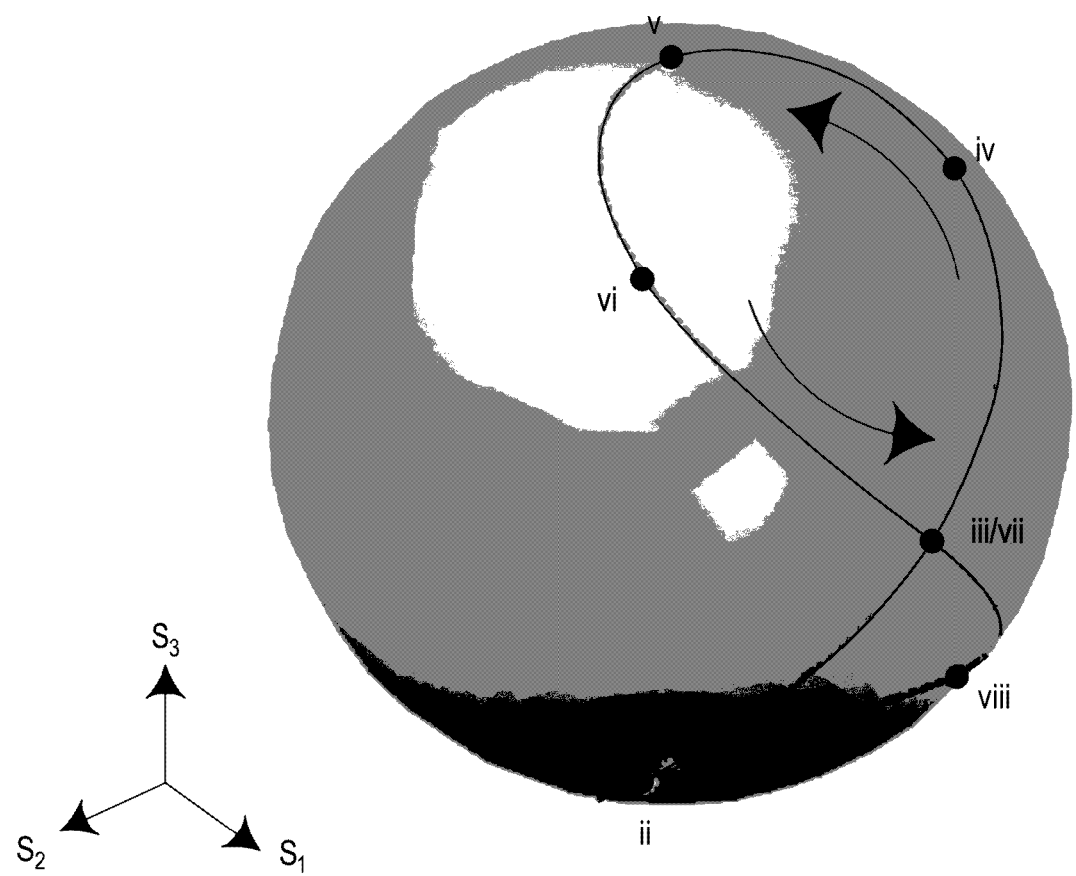
FIG. 11 is a pathway of changing analysis polarization states illustrated on the Poincaré sphere for analysing a beam having a uniform polarization state and orbital OAM generated using an apparatus according to the present disclosure.
Figure 12A:
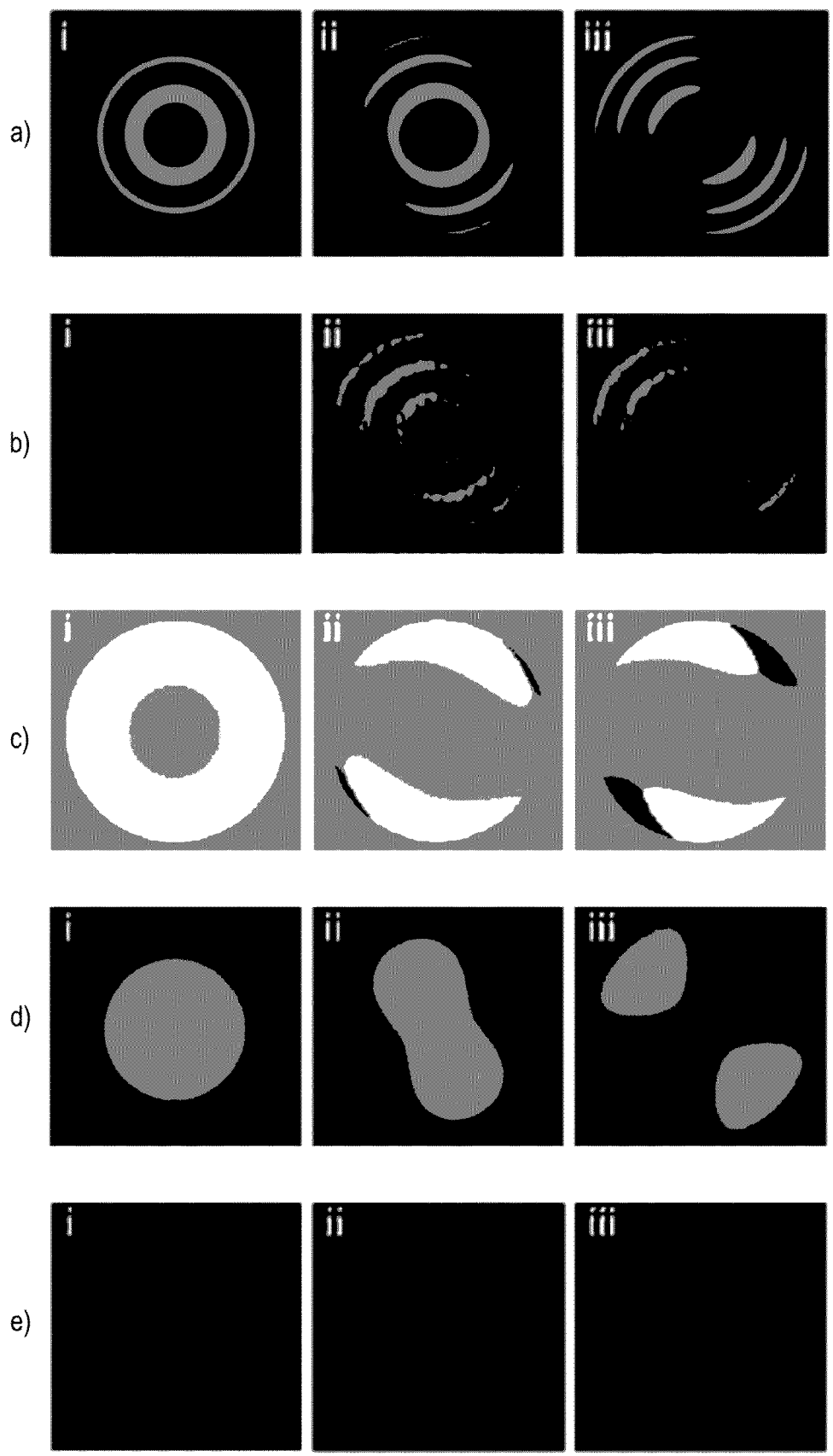
FIGS. 12a to 12d are experimental results and simulations for OAM beam generation at each of the analysis polarization states illustrated on the Poincaré sphere of FIG. 11.
Figure 12B:
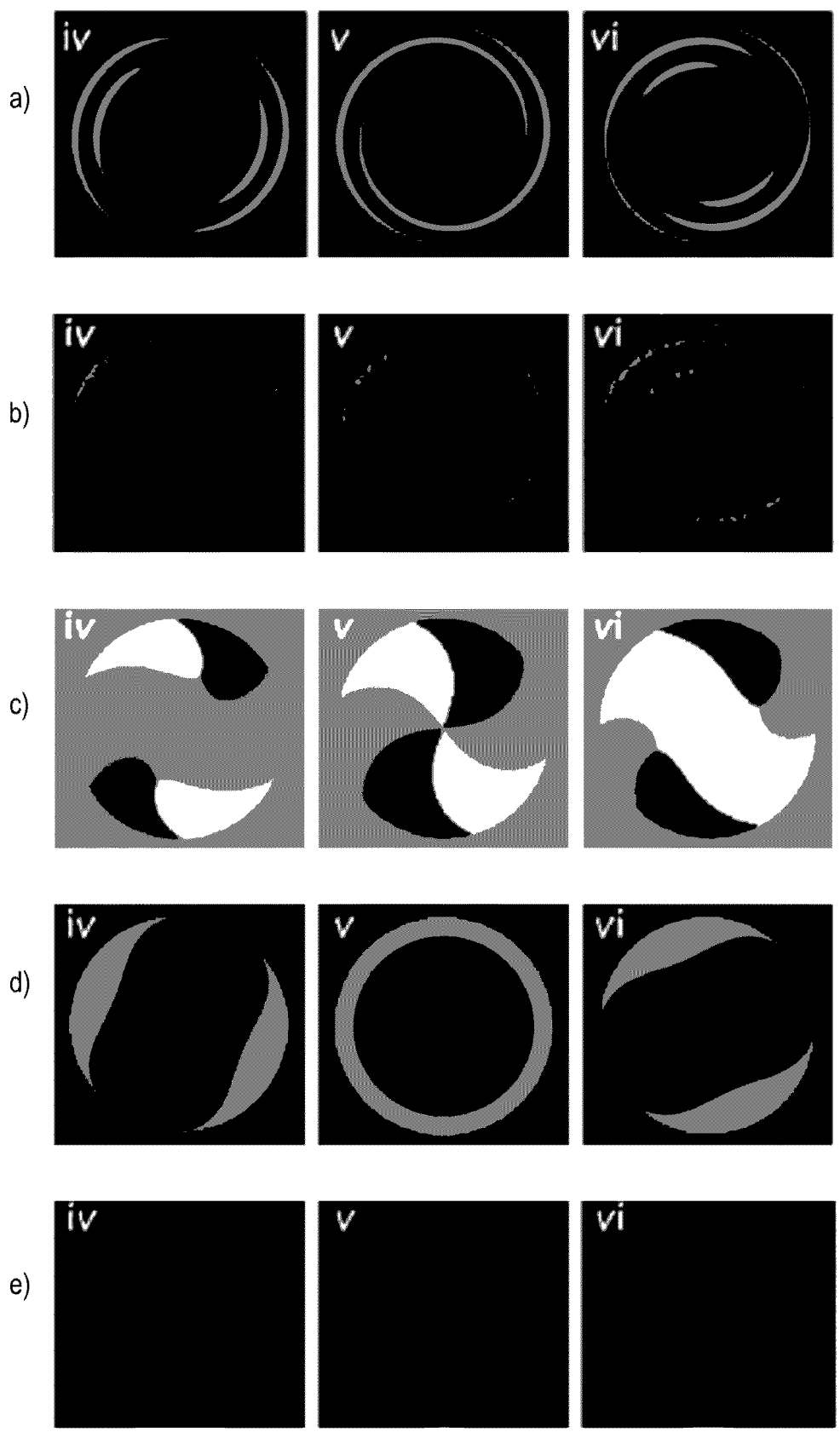
Figure 12C:
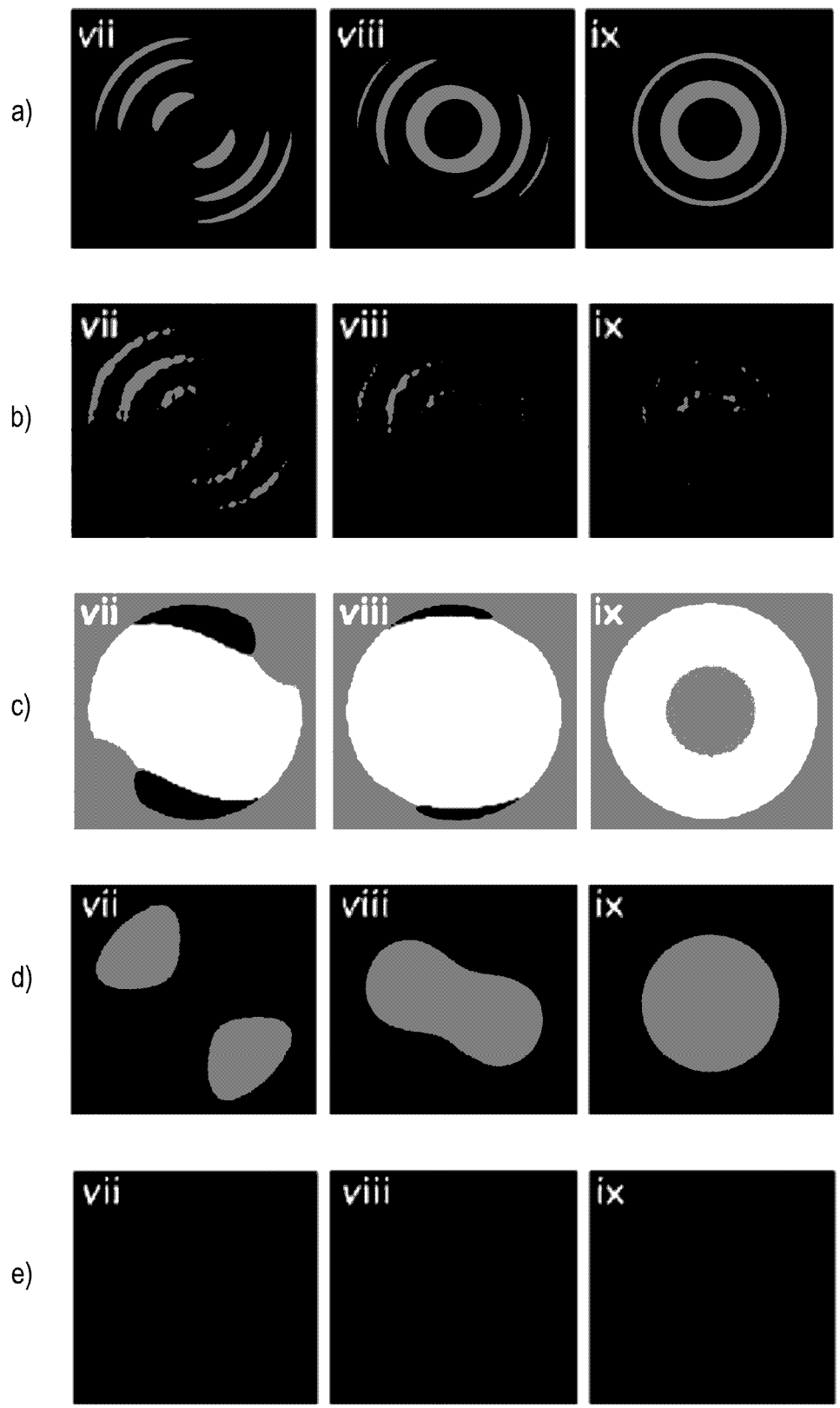
Figure 12D:
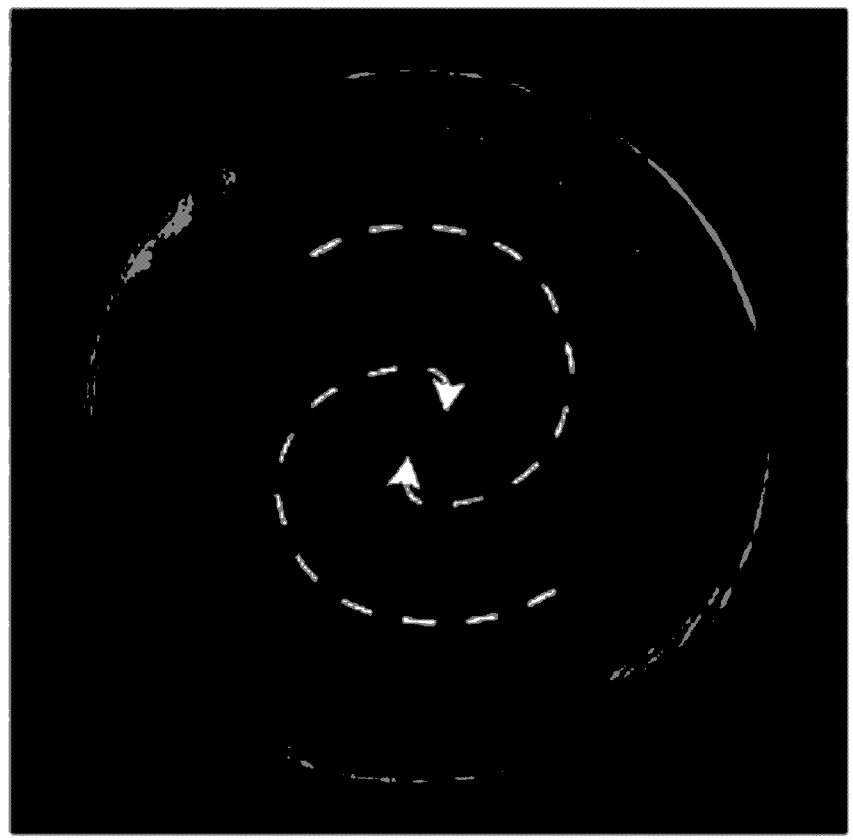

FIGS. 12a to 12c show experimental results and corresponding simulations for OAM generation at each of the analysis polarization states i to ix illustrated on the Poincaré sphere of FIG. 11. In each of FIGS. 12a, 12b and 12c, row a) shows simulated interference patterns, row b) shows experimentally obtained interference patterns, row c) shows simulated phase patterns, row d) shows simulated intensity distributions and row e) shows experimentally obtained intensity distributions. To traverse the analysis path from i to ix on the Poincaré sphere the QWP2 in the PSA 406 was rotated from −45 degrees to 135 degrees in 22.5 degree increments. FIG. 12d shows the interferometric pattern under state v in greater detail, which is obtained for right hand circular incident and opposite handedness analysis. The existence of 2 spirals in FIG. 12d (indicated by the two superimposed arrows) validates that the GRIN lens arrangement of FIG. 4 can generate 2 units of OAM when under this configuration, which also agrees well with the theoretical prediction.

Figure 13:
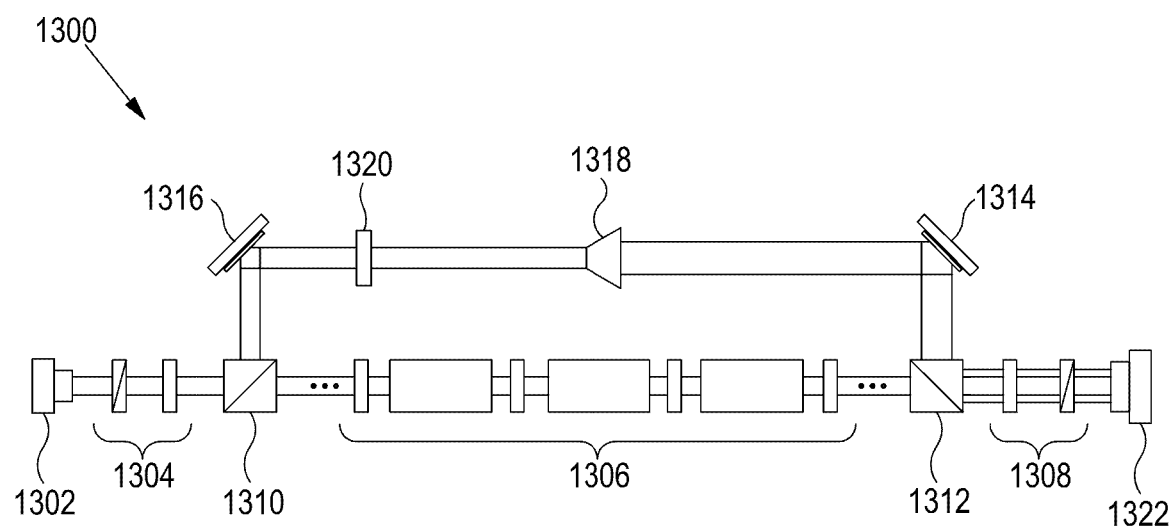
FIG. 13 is an exemplary experimental setup used to obtain the interference patterns shown in FIGS. 12a to 12d.

FIG. 13 illustrates in detail the experimental setup used to obtain the interference patterns shown in FIGS. 12a to 12c. It is a Mach-Zehnder type interferometer formed by a pair of beam splitters 1310 and 1312 and silver mirrors 1314 and 1316. A He—Ne laser 1302 is used as the light source (633 nm, 2 mW), a polarizer and a quarter wave plate form an effective PSG 1304 (i.e. the same as PSG 402 in FIG. 4) to generate uniform incident polarization light field into the GRIN lens based transformation module 1306 (i.e. in one case the same as transformation module 404 in FIG. 4). The light reflected by the first beam splitter 1310 is the reference beam for the reference arm, which passing by a silver mirror 1316 then is modulated by a half wave plate 1320 and a beam expander 1318. After that, the beam is reflected again by another silver mirror 1314 and then combined with the beam from the transformation module 1306 by the second beam splitter 1312. Finally, a second quarter wave plate and the polarizer form an effective PSA 1308 (i.e. the same as PSA 406 in FIG. 4) which filters the polarization state of the reference beam and beam emerging from the transformation module. This produces interference between the two beams and allows absolute phase information to be determined by recording the output light on a CCD camera 1322.

Using different transformation modules (i.e. different numbers of GRIN lenses and interstitial components as discussed above) as well as different incident and analysis polarization states enables other OAM beams to be produced. As above, the equivalent Jones Matrix of GRIN lens is equal to:

$$J_{GRIN} = \frac{1}{2}\begin{bmatrix} J_{11} & J_{12} \\ J_{21} & J_{22} \end{bmatrix} = \begin{bmatrix} \sin^2(\theta)+\epsilon\cos^2(\theta) & (\epsilon-1)\sin(\theta)\cos(\theta) \\ (\epsilon-1)\sin(\theta)\cos(\theta) & \cos^2(\theta)+\epsilon\sin^2(\theta) \end{bmatrix} \quad (4)$$

where $\epsilon = e^{i\sigma} = \cos(\sigma)+i\sin(\sigma)$, and $\sigma = f(r) \propto n_e(r)$, θ is the fast axis direction of the equivalent wave plate which equals to the azimuthal angle in the cylindrical coordinate system, r is the radius of the section of GRIN lens, a is the linear retardance value of the equivalent wave plate at the fixed r and θ. Therefore:

$$J_{11}=1-\cos(2\theta)+\cos(\sigma)+\cos(\sigma)\cos(2\theta)+(\sin(\sigma)+\sin(\sigma)\cos(2\theta))i \quad (5)$$

$$J_{12}=-\sin(2\theta)+\cos(\sigma)\sin(2\theta)+\sin(\sigma)\sin(2\theta)i \quad (6)$$

$$J_{21}=-\sin(2\theta)+\cos(\sigma)\sin(2\theta)+\sin(\sigma)\sin(2\theta)i \quad (7)$$

$$J_{22}=1-\cos(2\theta)+\cos(\sigma)-\cos(\sigma)\cos(2\theta)+(\sin(\sigma)-\sin(\sigma)\cos(2\theta))i \quad (8)$$

Suppose a uniformly polarized beam represents by Jones Vector $E_{in}$ passes through the GRIN lens $J_{GRIN}$, the properties of the generated vector $E_{out}=J_{GRIN} \cdot E_{in}$ is examined in two specific eigenpolarization bases $E_1=\text{Span}([1,0]^T,[0,1]^T)$ and $E_2=\text{Span}([1,i]^T,[1,-i]^T)$. If the incident polarization state right hand circular then:

$$J_{GRIN}\begin{bmatrix}1\\i\end{bmatrix} = z'_1\begin{bmatrix}1\\0\end{bmatrix} + z'_2\begin{bmatrix}0\\1\end{bmatrix} \quad (9)$$

Since $[z_1\ z_2]$ contains both intensity and absolute phase information, the complex intensity/phase profile can be separated into 4 discrete and ordered parts, which makes it easier for further validation and analysis of the beam composition. $[z_1\ z_2]$ can be written in exponential form as $$z'_1 = \frac{1}{2}(e^{i0}+e^{i\sigma}+e^{i(2\theta+\pi)}+e^{i(\sigma+2\theta)}),$$

$$z'_2 = \frac{1}{2}(e^{i(\frac{\pi}{2})}+e^{i(\sigma+\frac{\pi}{2})}+e^{i2(\theta+\frac{\pi}{4})}+e^{i(\sigma+2\theta\frac{\pi}{2})}),$$

so equation (9) can be also expressed as equation (10) below:

$$J_{GRIN}\begin{bmatrix}1\\i\end{bmatrix} = \frac{1}{2}(e^{i0}+e^{i\sigma}+e^{i(2\theta+\pi)}+e^{i(\sigma+2\theta)})\begin{bmatrix}1\\0\end{bmatrix} + \quad (10)$$
$$\frac{1}{2}(e^{i(\frac{\pi}{2})}+e^{i(\sigma+\frac{\pi}{2})}+e^{i2(\theta+\frac{\pi}{4})}+e^{i(\sigma+2\theta\frac{\pi}{2})})\begin{bmatrix}0\\1\end{bmatrix}$$

The analysis under the basis $E_2=\text{Span}([1,i]^T,[1,-i]^T)$ has been done above with an incident vector of $[1,i]^T$ (i.e. right hand circular polarization incident state). If the incident vector is from the other basis $E_1=\text{Span}([1,0]^T,[0,1]^T)$, then horizontal linear polarized incident light $[1,0]^T$ can be chosen, then examined by $E_1$ and $E_2$ separately:

$$J_{GRIN}\begin{bmatrix}1\\0\end{bmatrix} = z_1''\begin{bmatrix}1\\0\end{bmatrix} + z_2''\begin{bmatrix}0\\1\end{bmatrix} \quad (11)$$

Then it is possible to calculate the $z''_1$ and $z''_2$ by using the same analysis process before giving:

$$z_1'' = \quad (12)$$
$$\begin{cases} \frac{1}{2}(e^{i0} + e^{i\sigma}) + \frac{1}{2}|\cos(2\theta)|(e^{i0} + e^{i(\sigma+\pi)}), \theta \in \left[-\frac{3\pi}{4}, -\frac{\pi}{4}\right] \cup \left[\frac{\pi}{4}, \frac{3\pi}{4}\right] \\ \frac{1}{2}(e^{i0} + e^{i\sigma}) + \frac{1}{2}|\cos(2\theta)|(e^{i\pi} + e^{i\sigma}), \text{Otherwise} \end{cases}$$

$$z_2'' = \begin{cases} \frac{1}{2}|\sin(2\theta)|(e^{i0} + e^{i(\sigma+\pi)}), \theta \in \left[-\frac{\pi}{2}, 0\right] \cup \left[\frac{\pi}{2}, \pi\right] \\ \frac{1}{2}|\sin(2\theta)|(e^{i\pi} + e^{i\sigma}), \text{Otherwise} \end{cases} \quad (13)$$

Figure 14:
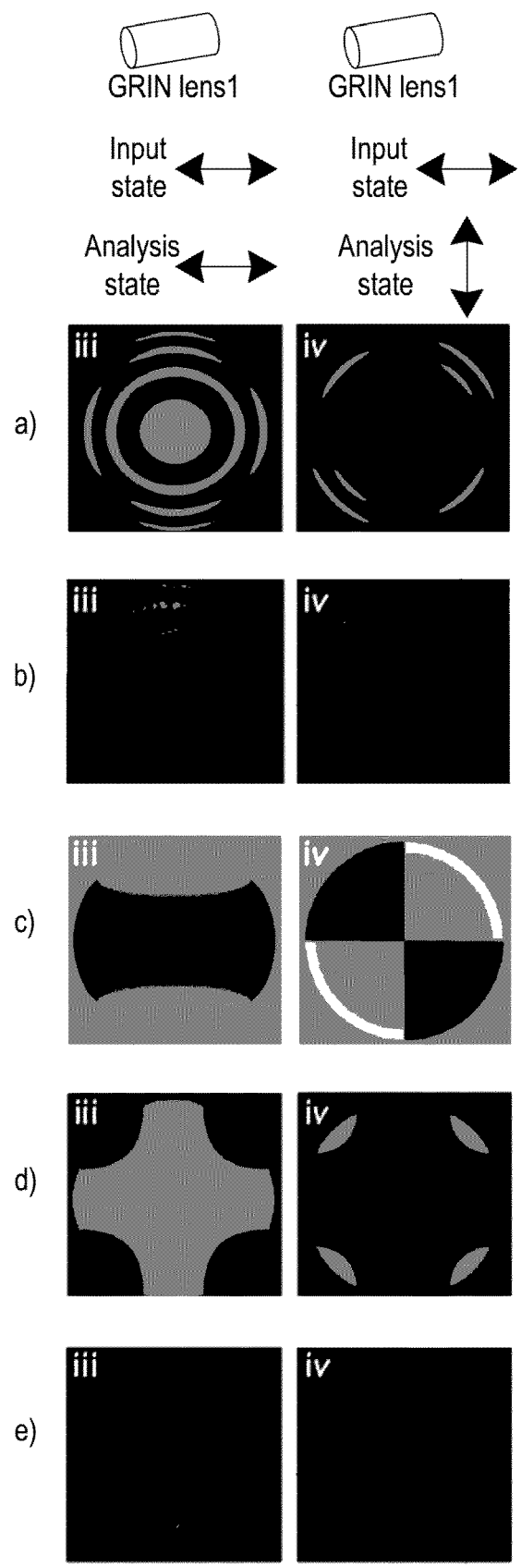
FIGS. 14 to 16 are further experimental results of phase modulation.

FIG. 14 shows the phase profiles, intensity distributions as well as the interference patterns (superposed by same polarized light with uniform plane wave front) for the beams with profiles $z''_2$ and $z''_1$. Rows (a) to (e) correspond to: simulated interference patterns, experimental interference patterns, simulated absolute phase profiles, simulated intensity distributions and experimental intensity distributions respectively for the indicated polarization states and GRIN lens cascade (i.e. single GRIN lens transformation module for the results shown in FIG. 14). The results also show that the GRIN lens can generate special gradually changing but quadrant segmented 'phase blocks', which is taking advantage of the birefringence property of the GRIN lens.

Next, the basis $E_2=\text{Span}([1, i]^T, [1,-i]^T)$ is used as the analysis eigenbasis yielding:

$$J_{GRIN}\begin{bmatrix}1\\0\end{bmatrix} = z_1'''\begin{bmatrix}1\\i\end{bmatrix} + z_2'''\begin{bmatrix}1\\-i\end{bmatrix} \quad (14)$$

Then $z''_1$ and $z''_2$ are calculated through the same procedure detailed above giving:

$$z''_1 = \frac{1}{4}(e^{i0}+e^{i\sigma}+e^{-i2(\theta+\pi)}+e^{i(\sigma-2\theta)}) \quad (15)$$

$$z''_2 = \frac{1}{4}(e^{i0}+e^{i\sigma}+e^{i2(\theta+\pi)}+e^{i(\sigma+2\theta)}) \quad (16)$$

Figure 15:
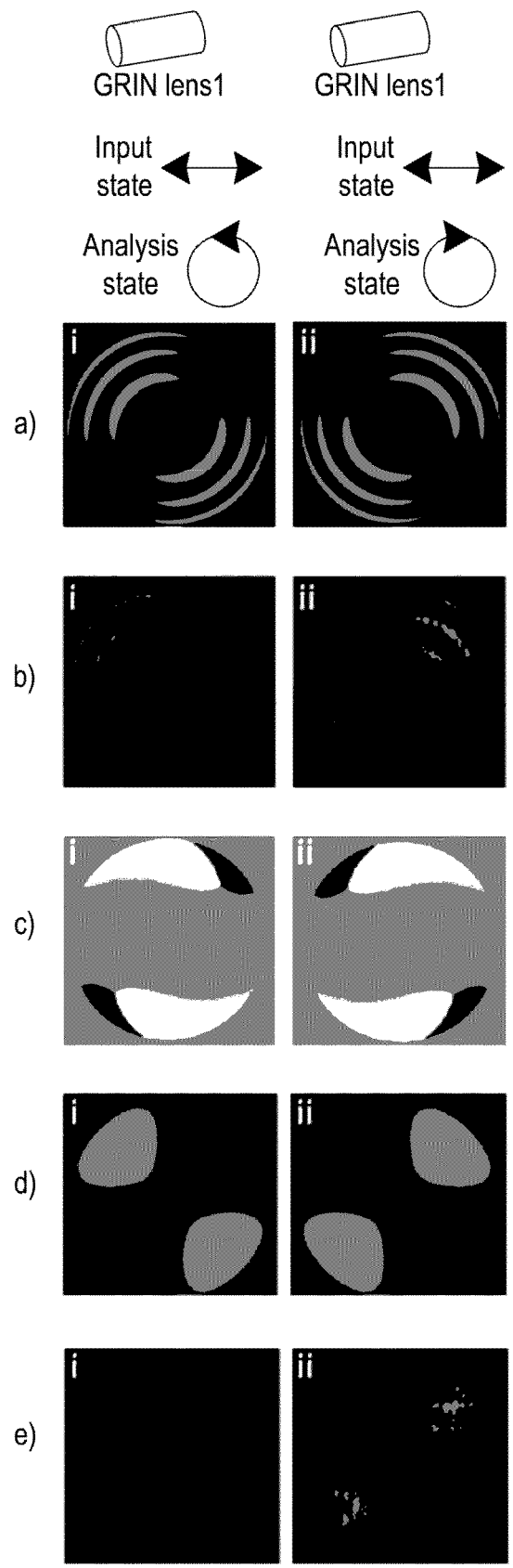

The phase profiles, intensity distributions as well as the interference patterns when using $[1,i]^T$ or $[1,-i]^T$ analysis is shown in FIG. 15 where the rows correspond to the same measured and simulated aspects as in FIG. 14. Again the experimental results agree well with the simulation. It should be noted that other incident eigenvectors under the basis of $E_1$ and $E_2$ can be easily calculated through the same process above. What is more, for any other eigenpolarization basis incident cases or analysis cases, the results also can be easily calculated based on the above analysis under the basis of $E_1$ and $E_2$.

Figure 16:
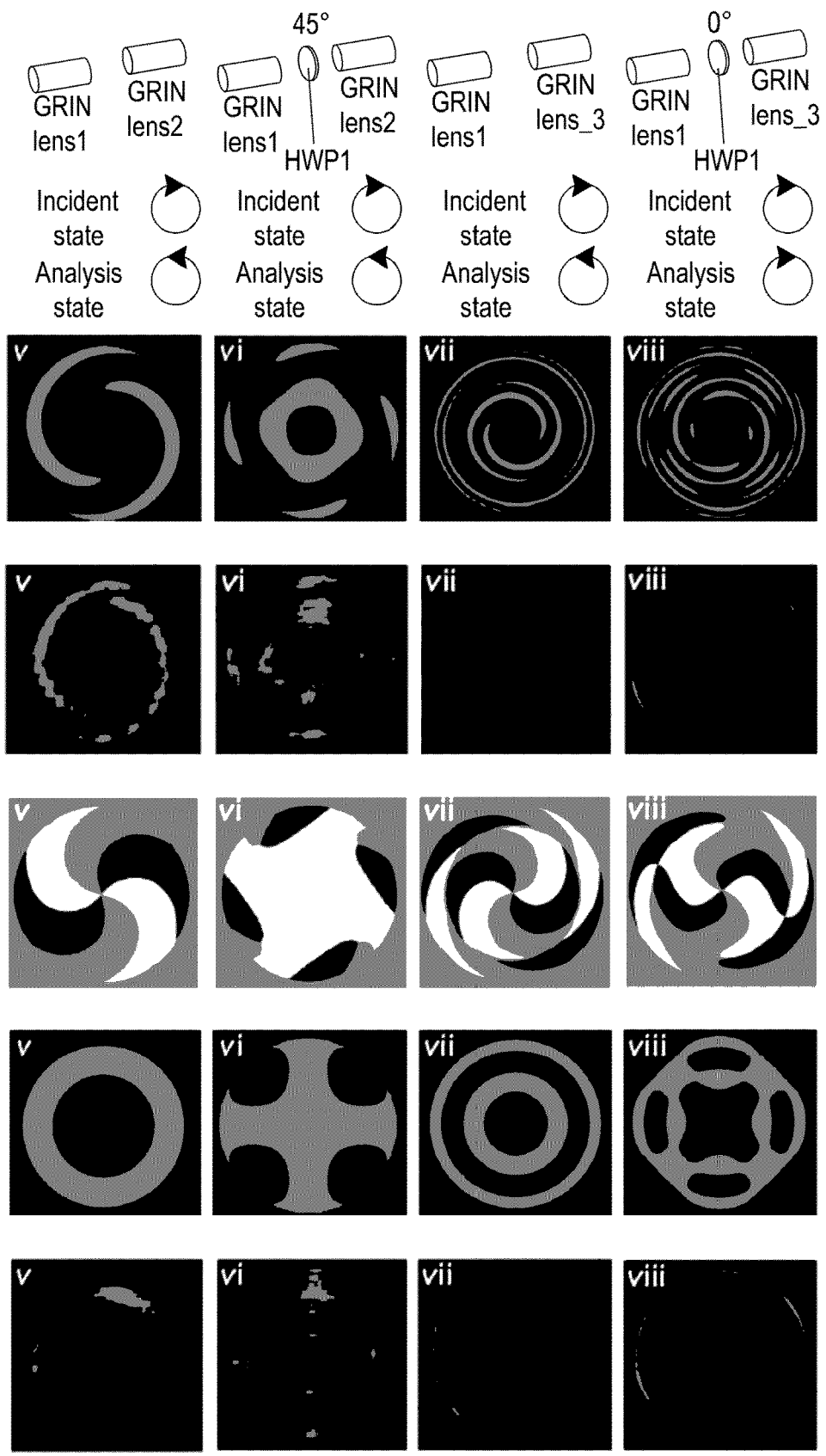

FIG. 16 shows further examples of complex absolute phase modulation through GRIN lens based structures. By choosing four typical structures, which have already been shown to generate complex structured polarization patterns in the discussion above regarding vector vortex beams, it is also demonstrated that these transformation module structures are capable of absolute phase modulation ability via eigenbasis $E_2=\text{Span}([1,i]^T, [1,-i]^T)$. From the corresponding phase profiles, intensity distributions as well as the interference patterns in FIG. 16 it is validated that the GRIN lens based structure is able to generate complex structured absolute phase profiles.

Single-Shot Mueller Matrix Polarimetry

Among various polarimetry techniques, Mueller matrix polarimetry is advantageous because it is capable of extracting comprehensive polarization properties of the sample under investigation. Mueller matrix polarimeters are normally designed based on time-sequentially generating and analysing different states of polarization of light by rotating polarization components or modulating variable retarders in the PSG and PSA of an apparatus. However, in general time sequential measurement is not suitable for fast moving object detection, as it leads to unexpected measurement errors, and hence would have limitation when applying it to in vivo detection to assist in clinical diagnosis.

Figure 17:
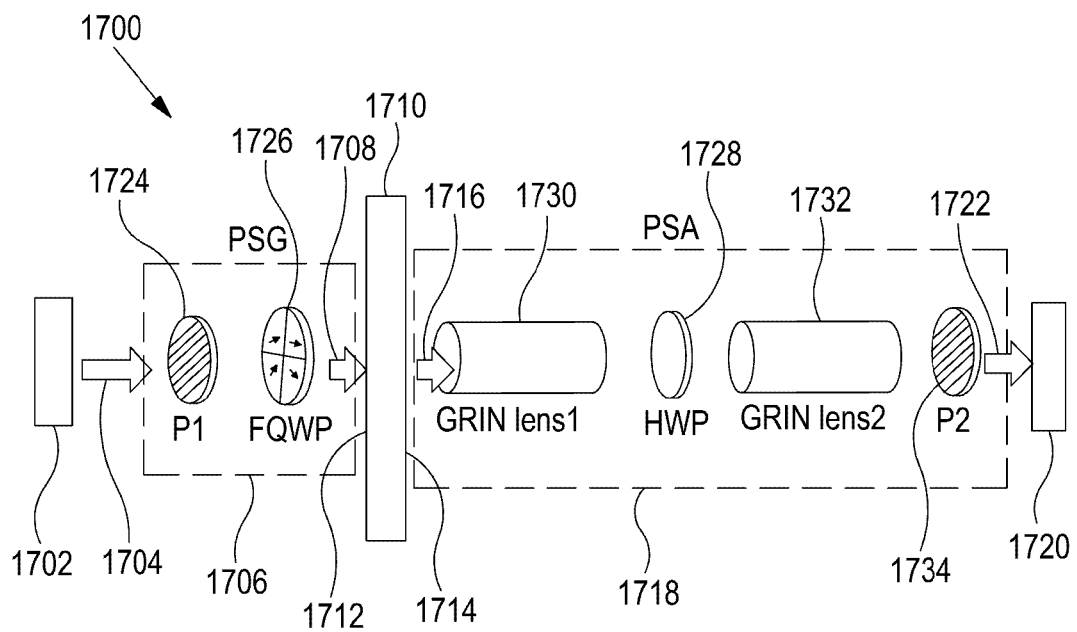
FIG. 17 is an exemplary single-shot Mueller matrix polarimeter which operates in transmission mode.

The inventor has appreciated that the GRIN lens cascade structure disclosed herein can be used as the basis for a single-shot Mueller matrix polarimeter 1700, an example of which is illustrated in FIG. 17, and comprises a light source 1702 arranged to provide a source field 1704; a polarization state generator 1706, PSG, arranged to receive the source field and provide a probe 1708 field having a plurality of spatial portions, each portion having a different polarization state; a sample region 1710 for receiving a sample under investigation, the sample region having an input 1712 arranged to receive the probe field from the PSG and an output 1714 arranged to provide a modified probe field 1716 resulting from interaction of the probe field with the sample; a polarization state analyser 1718, PSA, arranged to receive the modified probe field and to apply, to each of the plurality of portions, a set of different linear retardances and a set of different fast axis orientations; and a detector 1720 arranged to detect the plurality of portions at an output 1722 of the PSA.

In the example of FIG. 17, the PSG comprises a linear polarizer 1724 and a segmented four-quadrant quarter wave plate array 1726 (FQWP), which is able to generate four polarization states simultaneously because each segment of the plate array has a different fast axis direction. For example, the different fast axis orientations could be 0, 30, 60, −45 degrees, although it should be appreciated that there are an infinite number of combinations for the choice of the four fast axis directions and retardances of the wave plate, and that these values are only exemplary values. The PSA comprises a half wave plate 1728 sandwiched between two GRIN lenses 1730 and 1732, combined with a polarizer 1734 at the output of the second GRIN lens.

Figure 18:
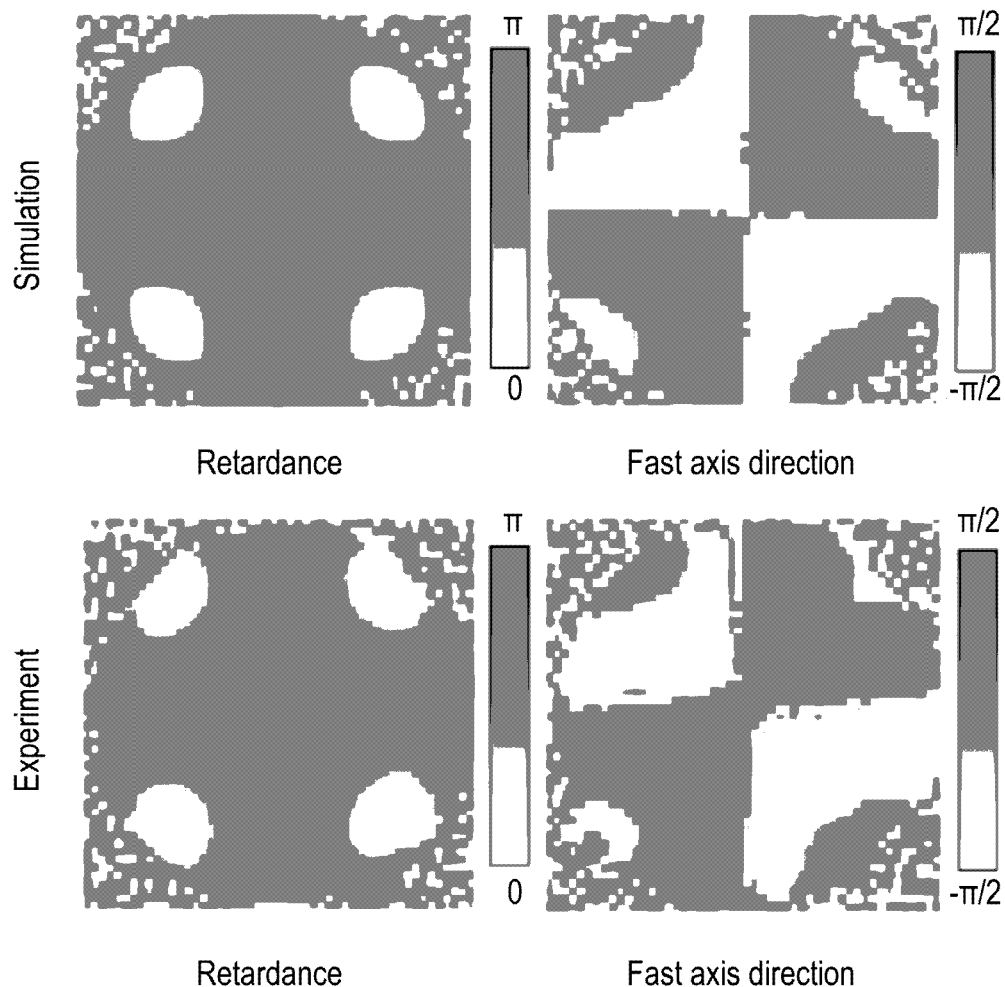
FIGS. 18 and 19 show experimental and theoretical properties of the Mueller matrix polarimeter.
Figure 19:
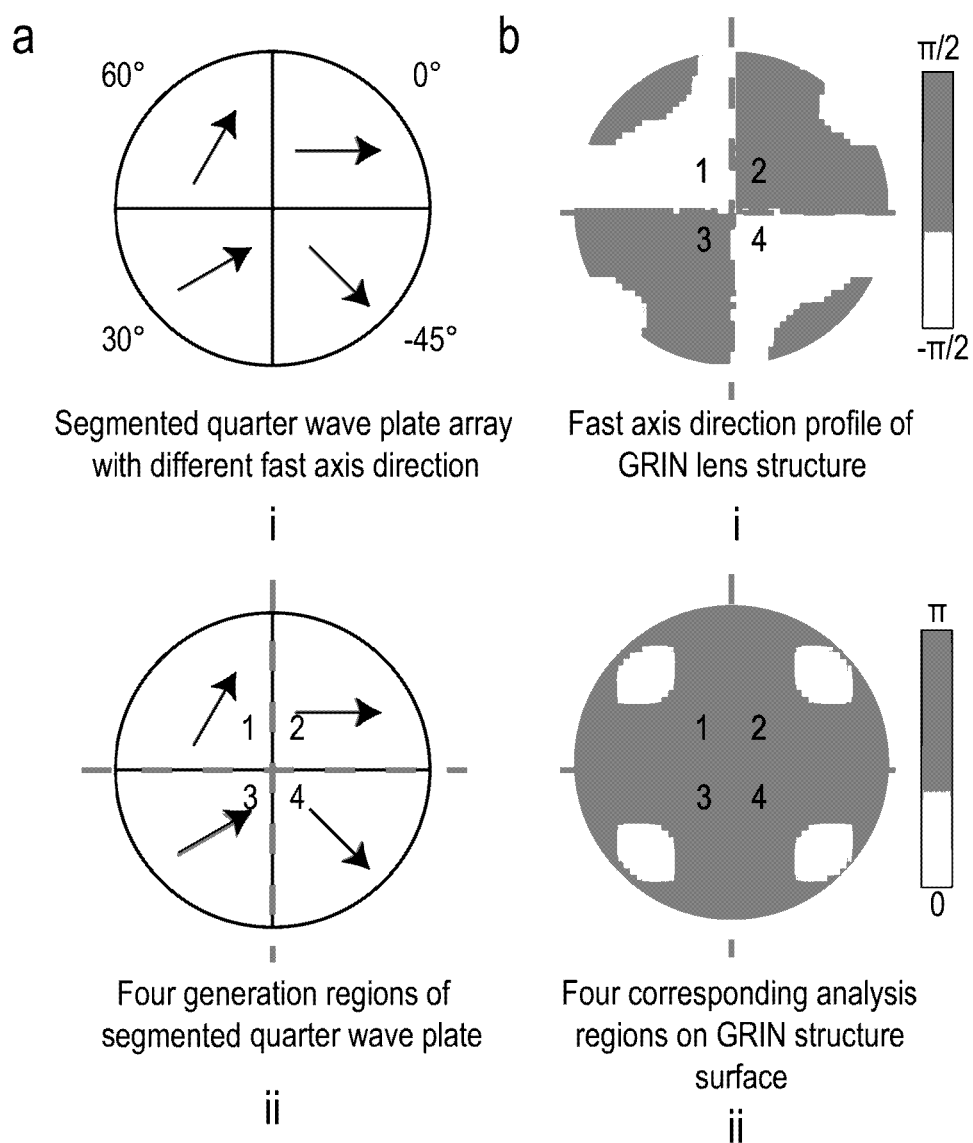

The Lu-Chipman Mueller matrix (MM) polar decomposition method (MMPD) is used to extract polarization parameters of the PSG and PSA combination shown in FIG. 17. MMPD is widely used to decompose the complicated interactions between sample and polarized light into a series processes, from which the sample's diattenuation (R), depolarisation (Δ), retardance (δ) and its fast axis direction (θ) can be obtained. The GRIN lens has no depolarization and diattenuation effect. The retardance and fast axis direction value from both simulation and experiment are shown in FIG. 18. It is found that these parameters are centrally symmetric and segmented into four channels, each of which can contain a full range of retardance and fast axis directions from 0 to π, which are therefore able to provide numerous polarization analysis channels. The multi-channels indeed allow the GRIN lens-based structure to be harnessed as a complete analyser to calculate four Stokes vectors in a single-shot. The segmented quarter wave plate array 1726 is shown in more detail in FIG. 19, panel (a). It comprises four segments of quarter wave plates with fast axes oriented at 60°, 0°, 30°, and −45. For the PSA part different ring regions from the GRIN lens surface have been chosen to calculate the Stokes vector according to the condition number. It has been found that the 132° phase retardance ring of the GRIN lens section has the lowest condition number with the measurement accuracy maximized. As shown in FIG. 19, panel (b), the polarisation characteristics under this GRIN lens structure are centrally symmetric and segmented into four quadrants, each quadrant can traverse all the retardance and fast axis directions, which means that the 132° phase retardance ring has already been included in our calculation including all the fast axis directions (the experimental GRIN lens has retardance bigger than 132°). This quality makes this structure into a multiple Stokes vectors analyser, which is what enables calculation of the Mueller matrix of the sample simultaneously.

The main equations describing the principle of operation of the MM polarimeter are derived below. Let n (n=1, 2, 3 and 4) denote the four areas of the PSG array corresponding to the four sectors of the FQWP, and m (m=4, 5, 6 . . . ) denote the chosen pixel number in each sector. The main measurement principle of the Mueller matrix polarimeter can be expressed in equations (17):

$$S_{out}^{n,m} = M_{P2} \cdot M_{GRIN2}^{n,m} \cdot M_{HWP} \cdot M_{GRIN1}^{n,m} \cdot M_{Sample} \cdot S_{in}^{n,m} \quad (17)$$

where $S_{in}^{n,m}$ represents incident Stokes vectors generated by the four sectors of the PSG array, the m is the chosen pixel number in each sector (all pixels in each sector have the same state of polarization). $S_{out}^{n,m}$ is the combination of out Stokes vectors (both in the channel m of the sector n; the same meanings are followed in the later description). $M_{Sample}$ denotes the MM of the targeted sample, and $M_{P2}$, $M_{HWP}$ denote the MMs of the polarizer and the half wave plate. $M_{GRIN1}^{n,m}$, $M_{GRIN2}^{n,m}$ are MMs of the GRIN lenses in the corresponding spatial positions. Since only intensity information can be recorded by the camera, which means only the first element of $S_{out}^{n,m}$ can be obtained (the intensity information at sector n from channel m), then Eq. (17) can be expanded into Eqs. (18) to Eq. (21) for the analysis through each channel, such that:

$$\begin{cases} I_{out}^{1,1} = A^{1,1} \cdot M_{sample} \cdot S_{in}^{1,1} \\ I_{out}^{1,2} = A^{1,2} \cdot M_{sample} \cdot S_{in}^{1,2} \\ I_{out}^{1,3} = A^{1,3} \cdot M_{sample} \cdot S_{in}^{1,3} \\ I_{out}^{1,4} = A^{1,4} \cdot M_{sample} \cdot S_{in}^{1,4} \\ \vdots \\ I_{out}^{1,m} = A^{1,m} \cdot M_{sample} \cdot S_{in}^{1,m} \end{cases} \quad (18)$$

$$\begin{cases} I_{out}^{2,1} = A^{2,1} \cdot M_{sample} \cdot S_{in}^{2,1} \\ I_{out}^{2,2} = A^{2,2} \cdot M_{sample} \cdot S_{in}^{2,2} \\ I_{out}^{2,3} = A^{2,3} \cdot M_{sample} \cdot S_{in}^{2,3} \\ I_{out}^{2,4} = A^{2,4} \cdot M_{sample} \cdot S_{in}^{2,4} \\ \vdots \\ I_{out}^{2,m} = A^{2,m} \cdot M_{sample} \cdot S_{in}^{2,m} \end{cases} \quad (19)$$

$$\begin{cases} I_{out}^{3,1} = A^{3,1} \cdot M_{sample} \cdot S_{in}^{3,1} \\ I_{out}^{3,2} = A^{3,2} \cdot M_{sample} \cdot S_{in}^{3,2} \\ I_{out}^{3,3} = A^{3,3} \cdot M_{sample} \cdot S_{in}^{3,3} \\ I_{out}^{3,4} = A^{3,4} \cdot M_{sample} \cdot S_{in}^{3,4} \\ \vdots \\ I_{out}^{3,m} = A^{3,m} \cdot M_{sample} \cdot S_{in}^{3,m} \end{cases} \quad (20)$$

$$\begin{cases} I_{out}^{4,1} = A^{4,1} \cdot M_{sample} \cdot S_{in}^{4,1} \\ I_{out}^{4,2} = A^{4,2} \cdot M_{sample} \cdot S_{in}^{4,2} \\ I_{out}^{4,3} = A^{4,3} \cdot M_{sample} \cdot S_{in}^{4,3} \\ I_{out}^{4,4} = A^{4,4} \cdot M_{sample} \cdot S_{in}^{4,4} \\ \vdots \\ I_{out}^{4,m} = A^{4,m} \cdot M_{sample} \cdot S_{in}^{4,m} \end{cases} \quad (21)$$

Then suppose a vector is defined such that:

$$I_{out} = [I_{out}^{1,1} \ldots I_{out}^{1,m} I_{out}^{2,1} \ldots I_{out}^{2,m} I_{out}^{3,1} \ldots I_{out}^{3,m} I_{out}^{4,1} \ldots I_{out}^{4,m}]^T \quad (22)$$

which is the intensity information recorded by the camera for each modulation and detection channel. And also let $$A = [A^{1,1} \ldots A^{1,m} A^{2,1} \ldots A^{2,m} A^{3,1} \ldots A^{3,m} A^{4,1} \ldots A^{4,m}]^T \quad (23)$$

which is a 4m×4 matrix that comprises by $A^{n,m}$, i.e., each first row of the corresponding $M_{P2} \cdot M_{GRIN2}^{n,m} \cdot M_{HWP} \cdot M_{GRIN1}^{n,m}$. Each element that in A has $A^{n,m} = [a_0^{n,m} \ a_1^{n,m} \ a_2^{n,m} \ a_3^{n,m}]$. Then expanding $S_{in}^{n,m} = [s_0^{n,m} \ s_1^{n,m} \ s_2^{n,m} \ s_3^{n,m}]^T$, and letting $$S_{in} = \begin{bmatrix} s_0^{1,1} & \ldots & s_0^{1,m} & s_0^{2,1} & \ldots & s_0^{2,m} & s_0^{3,1} & \ldots & s_0^{3,m} & s_0^{4,1} & \ldots & s_0^{4,m} \\ \vdots & \ddots & \vdots & \vdots & \ddots & \vdots & \vdots & \ddots & \vdots & \vdots & \ddots & \vdots \\ s_3^{1,1} & \ldots & s_3^{1,m} & s_3^{2,1} & \ldots & s_3^{2,m} & s_3^{3,1} & \ldots & s_3^{3,m} & s_3^{4,1} & \ldots & s_3^{4,m} \end{bmatrix} \quad (24)$$

which is 4×4m matrix that consists of columns that are individual Stokes vectors from each combination of PSG sectors and camera pixels, then equations 18 to 24 above can be combined as:

$$I_{out} = A \cdot M_{Sample} \cdot S_{in} \quad (25)$$

$$\begin{bmatrix} I_{out}^{1,1} \\ \vdots \\ I_{out}^{1,m} \\ I_{out}^{2,1} \\ \vdots \\ I_{out}^{2,m} \\ I_{out}^{3,1} \\ \vdots \\ I_{out}^{3,m} \\ I_{out}^{4,1} \\ \vdots \\ I_{out}^{4,m} \end{bmatrix} = \begin{bmatrix} a_0^{1,1} & a_1^{1,1} & a_2^{1,1} & a_3^{1,1} \\ \vdots & & & \vdots \\ a_0^{1,m} & a_1^{1,m} & a_2^{1,m} & a_3^{1,m} \\ a_0^{2,1} & a_1^{2,1} & a_2^{2,1} & a_3^{2,1} \\ \vdots & & & \vdots \\ a_0^{2,m} & a_1^{2,m} & a_2^{2,m} & a_3^{2,m} \\ a_0^{3,1} & a_1^{3,1} & a_2^{3,1} & a_3^{3,1} \\ \vdots & & & \vdots \\ a_0^{3,m} & a_1^{3,m} & a_2^{3,m} & a_3^{3,m} \\ a_0^{4,1} & a_1^{4,1} & a_2^{4,1} & a_3^{4,1} \\ \vdots & & & \vdots \\ a_0^{4,m} & a_1^{4,m} & a_2^{4,m} & a_3^{4,m} \end{bmatrix} \cdot M_{Sample} \cdot \quad (26)$$

$$\begin{bmatrix} s_0^{1,1} & \ldots & s_0^{1,m} & s_0^{2,1} & \ldots & s_0^{2,m} & s_0^{3,1} & \ldots & s_0^{3,m} & s_0^{4,1} & \ldots & s_0^{4,m} \\ \vdots & \ddots & \vdots & \vdots & \ddots & \vdots & \vdots & \ddots & \vdots & \vdots & \ddots & \vdots \\ s_3^{1,1} & \ldots & s_3^{1,m} & s_3^{2,1} & \ldots & s_3^{2,m} & s_3^{3,1} & \ldots & s_3^{3,m} & s_3^{4,1} & \ldots & s_3^{4,m} \end{bmatrix}$$

$$M_{Sample} = A^{-1} \cdot I_{out} \cdot S_{in}^{-1} \quad (27)$$

The MM of the sample can be calculated via equation (27), in which $S_{in}^{-1}$ is the pseudo inverse matrix of $S_{in}$, and $A^{-1}$ is the pseudo inverse matrix of A.

Figure 20:
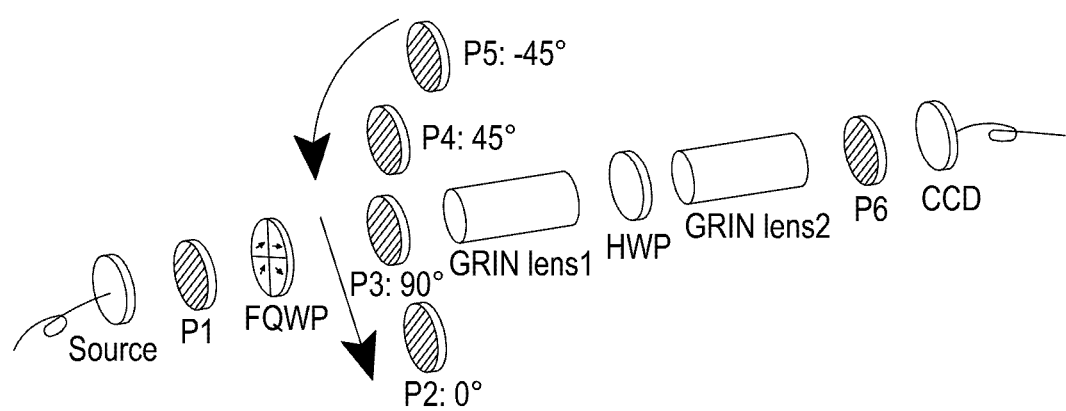
FIG. 20 is an experimental setup for testing the Mueller matrix polarimeter.
Figure 21:
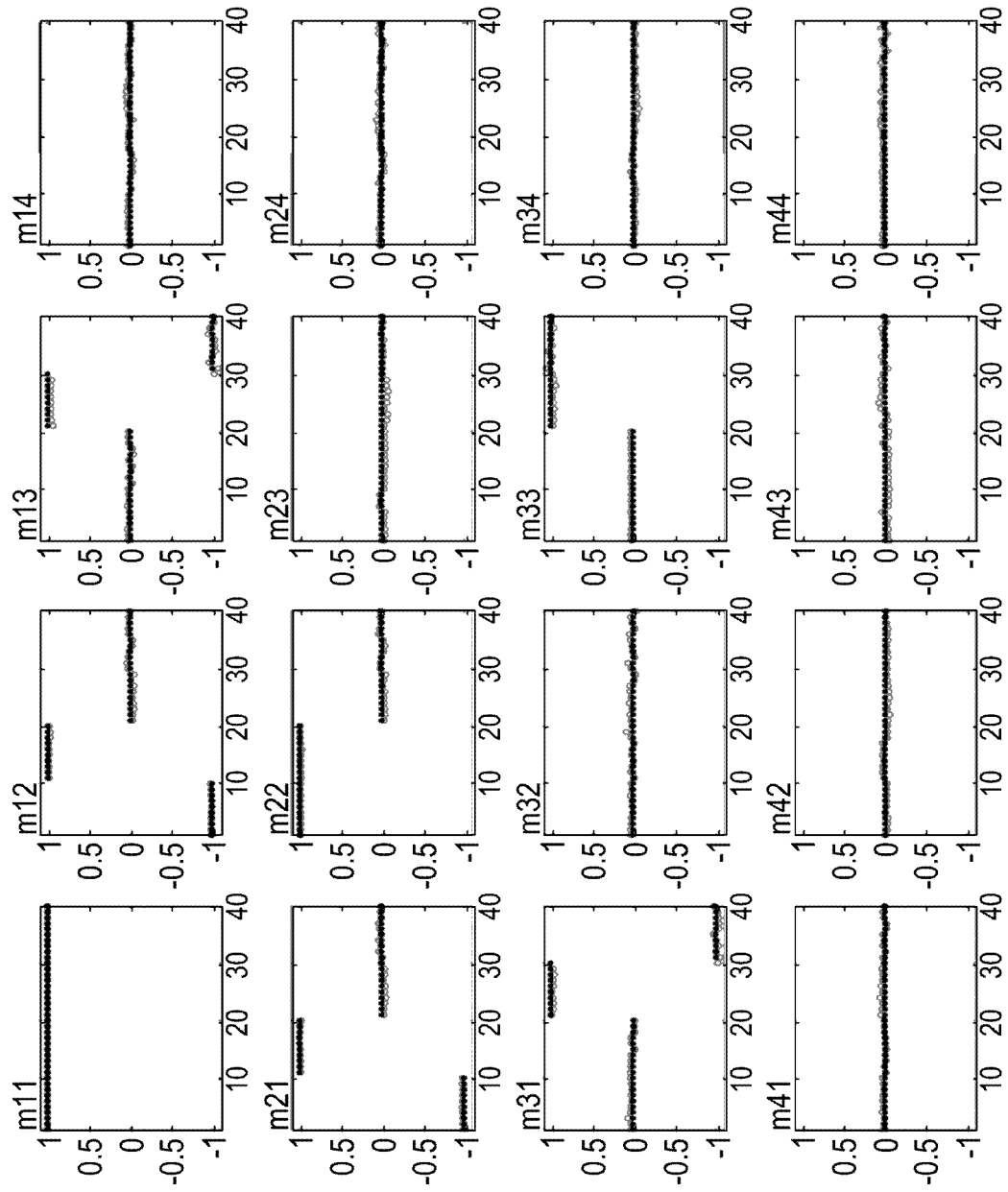
FIGS. 21 and 22 show experimental reconstruction of Mueller matrix elements and comparison with theoretical predictions for a number of different dynamic samples.
Figure 22:
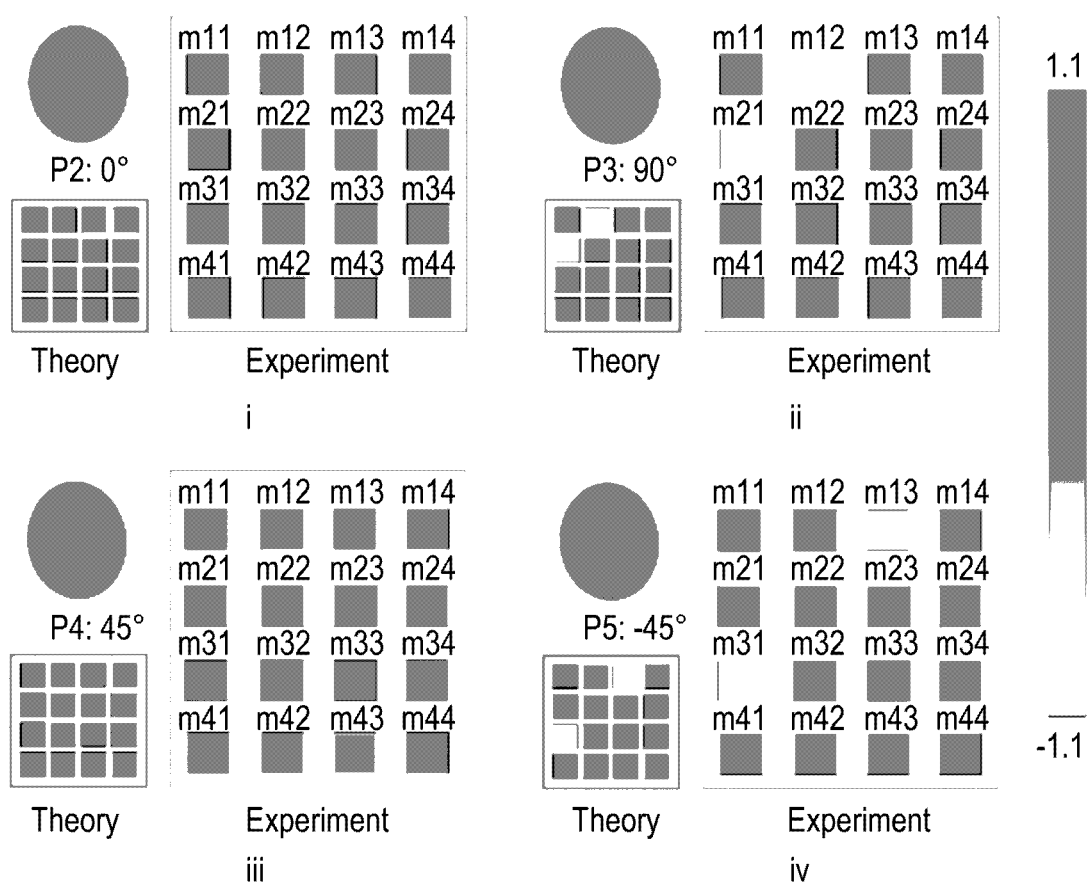

To validate the capability of the single-shot Mueller matrix polarimeter, four moving polarizers at different orientations (0, 90, 45, −45 degree) were used to simulate dynamical objects/samples under test. The experimental setup is illustrated schematically in FIG. 20. 10 points were tested for each object and the theoretical Mueller matrices were compared with the measured/reconstructed Mueller matrices for each object. The results are shown in FIG. 21 where the theoretical Mueller matrices are shown as black dots and the Mueller matrices as measured by the single-shot Mueller matrix polarimeter are shown as red dots. The horizontal axis is effectively a time axis as each test object tis moved through the sample region of the device with a different polarizer being measured for each interval of 10 units along the horizontal axis—hence the steps in the values of the individual Mueller matrix elements as a different polarizer comes into the sample region of the device. The results demonstrate that the measurement of each object has an average of the maximum error of all MM elements below 3.37%. These results demonstrate that the polarimeter is capable of measuring the Mueller matrix of a moving object with a high accuracy. Since the key constituent of the device is the GRIN lens based structure, it also has a potential to be minimized and combined with other optical devices such as fibres to be made into a scanning probe, to assist with minimally invasive surgery such as detecting the boundary of cancerous tissue. FIG. 22 shows the experimental and theoretical full Mueller matrices for the four test polarizers. It is also evident that the experimental and theoretical values of the four Mueller matrices are in excellent agreement.

The condition number (CN) of a matrix is widely used to seek an optimal instrument matrix, the minimal condition number of a matrix is 1. CN is also used to evaluate the measurement precision of a polarimeter, by evaluating the instrument matrix ($A^{n,m}$ in each sector) of it. The minimum CN of the instrument matrix of a Stokes polarimeter is 1.732. In the MM polarimeter disclosed herein, the PSA instrument matrices in each sector all reach 1.732. The instrument matrix A is a 4×4 matrix comprised by each first row of the matrices $M_{QWP}^n \cdot M_P^n$, (n=1, 2, 3, 4, represents each quadrant). By using a genetic algorithm, e.g. such as that integrated in the MATLAB® optimization toolbox, an optimized CN can be found for the PSG of a MM polarimeter.

To make the instrument more simple to model it was assumed that a single input linear polarizer 1724 was used and that all wave plates are quarter wave plates. Normally to reach the lowest value of CN=1.732 a 132 degrees retardance wave plate is required which is not easy to obtain. Further, it is assumed that two of the quarter wave plates in four quadrants of the FQWP are put into 45 and −45 degrees fast axis direction. Based on this, the input linear polarizer is fixed at 0 degrees, and four quarter wave plates with fast axis orientations of 15.9, 74.1, 45, −45 degrees. That leads to a CN of 3.599. Other choices such as: 15.1, 51.7, −15.1, −51.7 degrees or 38.3, 74.9, −38.3, −74.9 degrees (for the fast axis orientation of the quarter wave plate), could both have CN of 3.40. When the condition number is small (for example around 5), there would be not a big influence on the performance of the polarimeter. For example, for the above described design case: −45, 0, 30, 60, CN is 5.887, but the measurement precision is still good. It should be appreciated that in general there are infinitely many combinations of different angles which could be chosen giving rise to different CNs. However, in general the smaller the CN the better, especially in a realistic experimental environment where noise has an impact on measurement quality.

Figure 23:
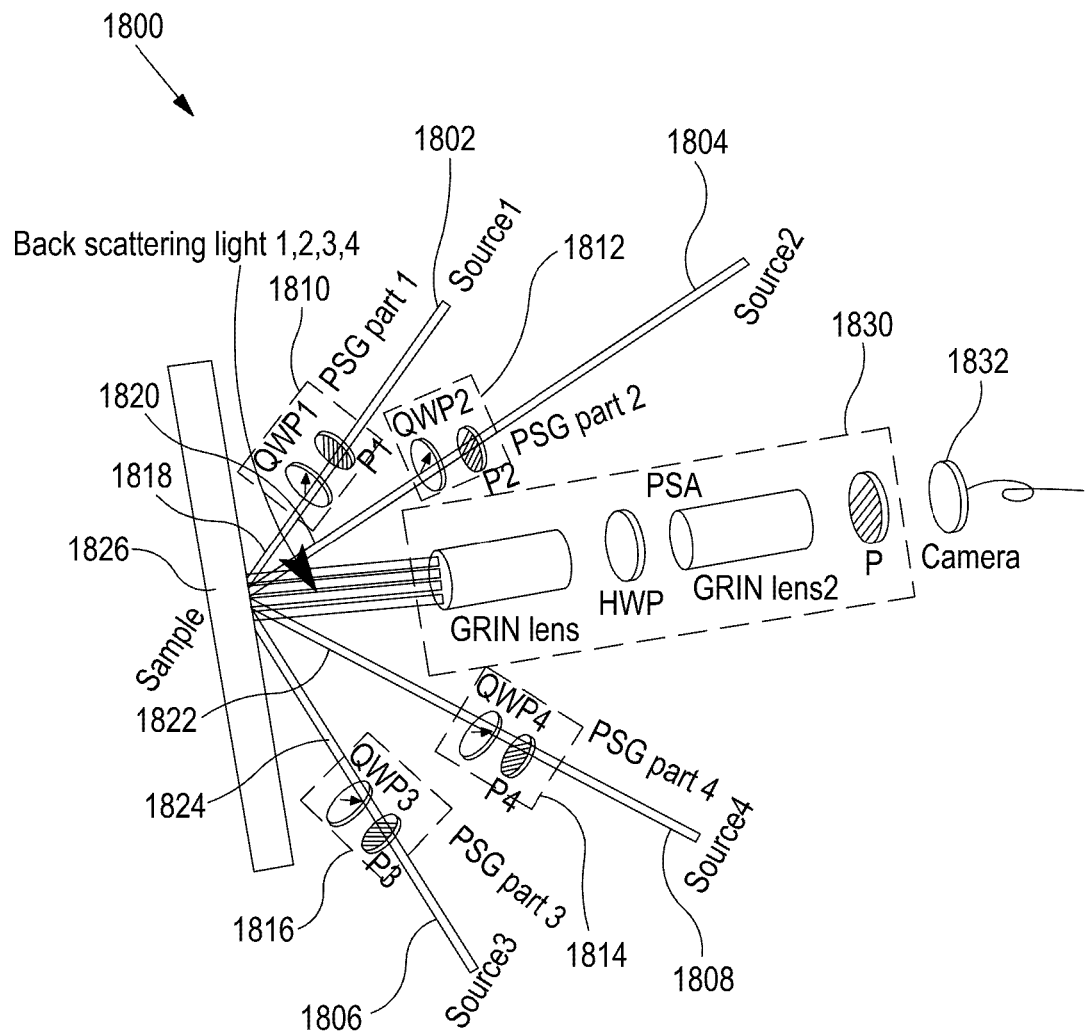
FIG. 23 shows an alternative single-shot Mueller matrix polarimeter which operates in a backscattering configuration.

FIG. 23 illustrates an alternative arrangement 1800 for a single-shot Mueller matrix polarimeter according to the present disclosure, wherein backscattered light from the sample under investigation is measured. The mathematics describing this alternative arrangement are the same as above but the physical geometry of the device is different. Four separate source fields 1802, 1804, 1806 and 1808 are generated, e.g. from a common light source (not shown) which is split into four spatial paths or from four separate light sources (not shown). Each source field is manipulated by a corresponding polarization state generator (PSG) 1810, 1812, 1814, 1816 which each consist of a linear polarizer followed by a quarter wave plate. The PSGs are arranged to produce four separate probe fields 1818, 1820, 1822 and 1824 each having a different state of polarization. The separate probe fields are incident onto a sample 1826 under investigation which is contained in a sample region of the device which has an input arranged to receive the separate probe fields. The sample region has an output arranged to provide a modified probe field 1828 resulting from interaction of the four separate probe fields with the sample. It will be appreciated that the four separate probe fields can be considered as one overall effective probe field having a plurality of spatial portions and the modified probe fields can be considered as one overall effective modified probe field having a plurality of corresponding spatial portions, depending on how the fields are defined. The modified probe field 1828 resulting from interaction and backscattering of the probe field from the sample is then incident on a polarization state analyser 1830, PSA, arranged to receive the modified probe field and to apply, to each of the plurality of portions, a set of different linear retardances and a set of different fast axis orientations. A detector 1832 is arranged to detect the plurality of portions at an output the PSA. In this example, the PSA comprises a half wave plate sandwiched between two GRIN lenses, combined with a polarizer 1734 at the output of the second GRIN lens. Compared to the device of FIG. 17, whilst the mathematical description is effectively the same, the PSG becomes effectively 4 separately parts but these effectively correspond to the four quadrants of the PSG used in the device of FIG. 17. The PSA receives the back-reflected light from the corresponding four illuminated areas of the sample (illuminated by the corresponding PSG part). It should be appreciated that the orientation of the HWP within the PSA does not affect the relative distribution of the retardance and fast axis direction of the PSA. Overall, only the relative position of the HWP compared with the PSG distribution is of relevance. This applies to the transmission mode device of FIG. 17 and the back-reflection mode device of FIG. 23.

Figure 24:
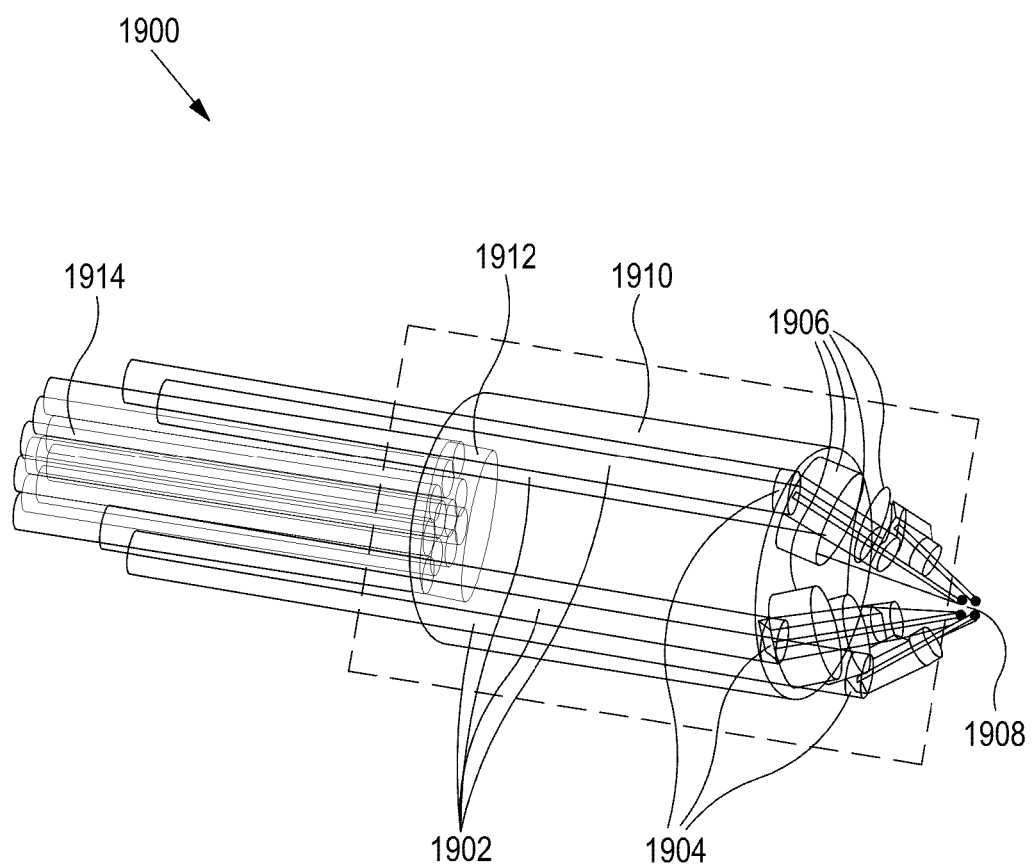
FIG. 24 shows the salient optical components of a fibre-based single-shot Mueller matrix polarimeter.

FIG. 24 illustrates a fibre-based single-shot Mueller matrix polarimeter according to the present disclosure. The principle of operation and corresponding mathematics set out above also apply to this device. A plurality of input fibres 1902 (four in the illustrated example) transmit a source field to four separate PSGs 1904, one situated at the end of each input fibre, each PSG consisting of a quarter wave plate as above with unique fast axis orientation and optionally also a linear polarizer. Focusing optics 1906, such as ball lenses, are used to focus light onto a sample 1908 under investigation. Back scattered light from the sample is then transmitted through a cascade of GRIN lenses 1910 and an output polarizer 1912 which forms the PSA of the device analogous in operation to the polarimetry devices described above. The output field of the PSA is collected by a single fibre or bundle of fibres 1914 and sent to a detector (not shown).

Further Description of GRIN Lens

Figure 25:
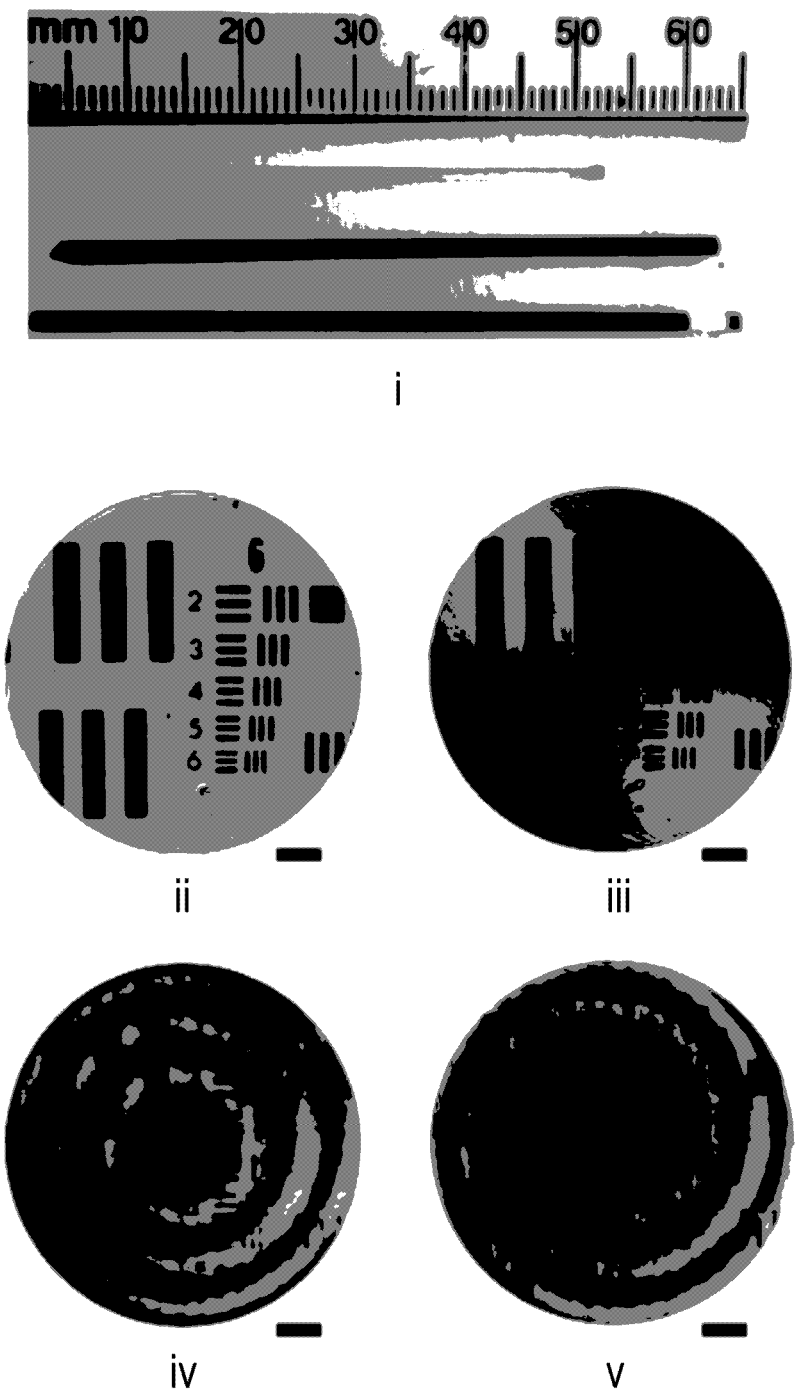
FIGS. 25 to 28 show various properties of a GRIN lens.

With reference to FIG. 25, panel (i) shows a commercial GRIN lens. Panel (ii) demonstrates imaging of a target by using a GRIN lens directly. Panel (iii) demonstrates obtained imaging and polarization pattern by using right hand circular polarized light incident and horizontal linear polarization state analysis, showing the GRIN lens is capable of acquiring imaging and modulation polarization simultaneously. Panel (iv) is based on (ii), another reference arm is added to gain the interference pattern to show the modulated wave front, which reveals that the GRIN lens can modulate absolute phase and polarization when obtaining imaging simultaneously. Panel (v) is a demonstration that using right hand circular polarized light as incident light (into GRIN lens) and opposite handedness analysis could obtain a light field that contains 2 units of OAM.

Figure 26:
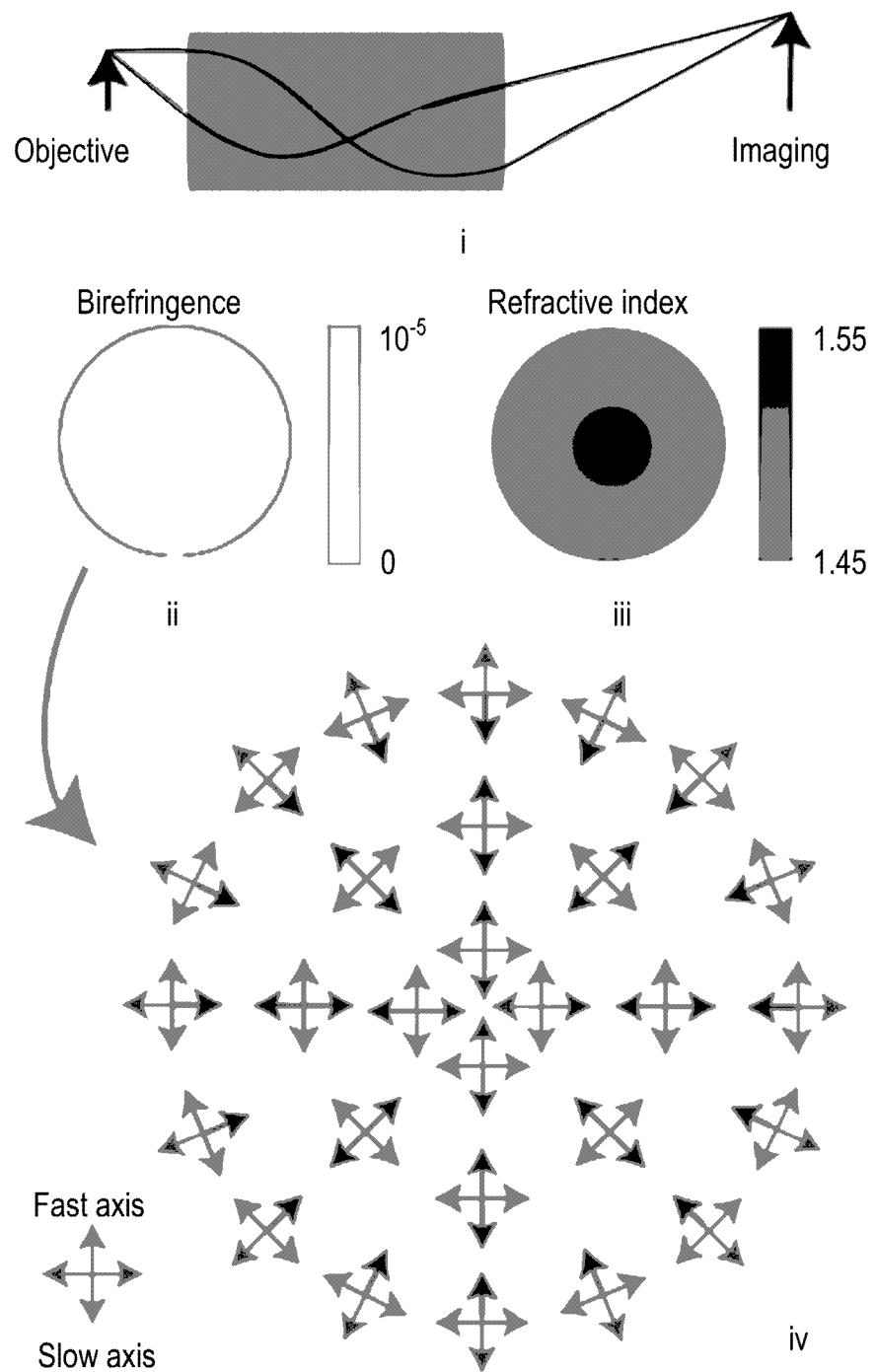

With reference to FIG. 26, panel (i) is a schematic of a GRIN lens imaging system and panels (ii) and (iii) show the birefringence and refractive index profile of a GRIN lens in cross section. Panel (iv) shows the equivalent fast axis/slow axis of the equivalent retarder contained in GRIN lens.

Figure 27:
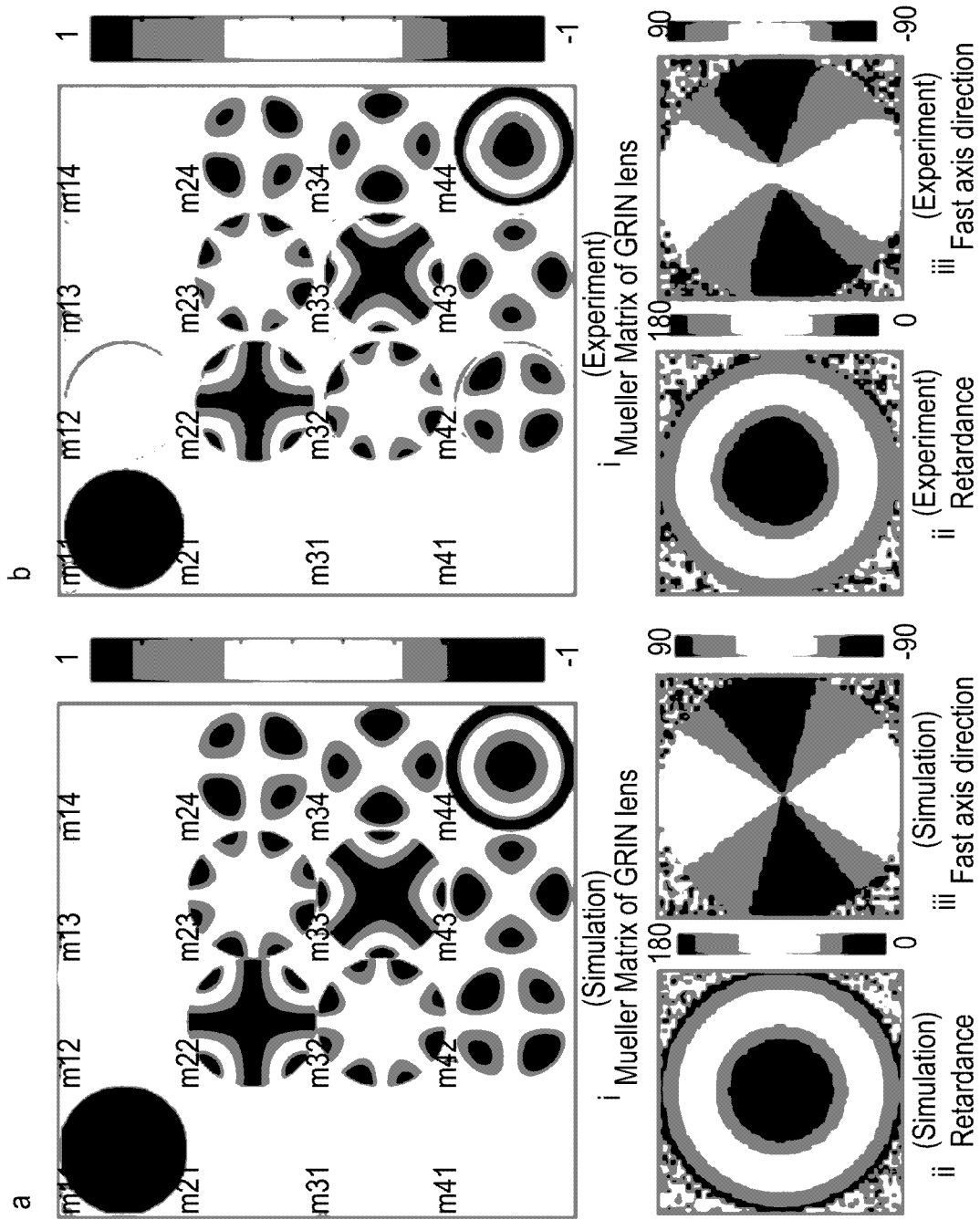

FIG. 27 shows the simulated (a) and experimental (b) Mueller matrix of a GRIN lens, panels (i), retardance, panels (ii), and fast axis direction, panels (iii). The results reveal that the birefringence property of GRIN lens can perform equivalently like a spatial-variant wave plate array with gradually increased linear retardance along the radial direction and rotated fast axis directions along azimuthal direction (gradually changing from $-\pi/2$ to 0 then to $\pi/2$ as the azimuthal angle change from 0 to $\pi$, then applying the mirror image of the fast axis directions themselves when the azimuthal angle changing from $\pi$ to $2\pi$).

Figure 28:
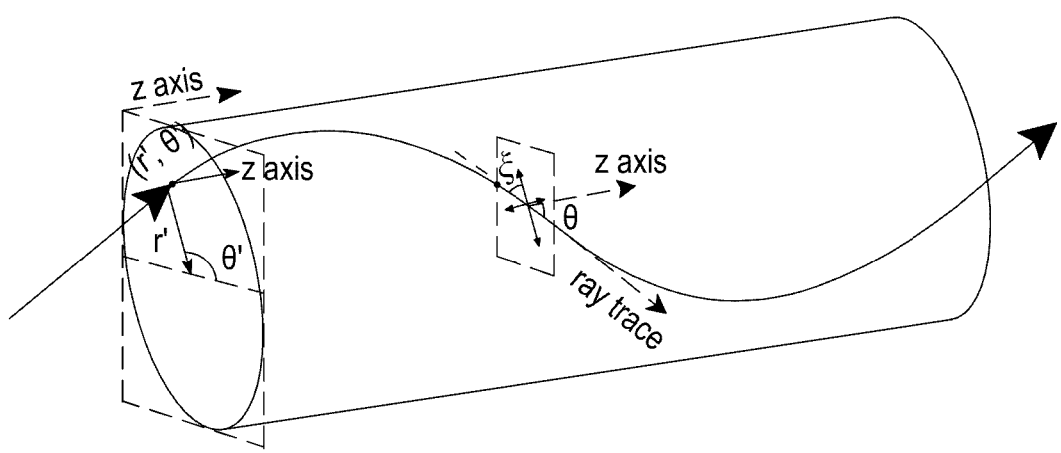

With reference to FIG. 28, for a general ray within the GRIN lens, the distance from the GRIN lens axis z is denoted by r, the azimuth of the incident position is denoted by $\theta$, and the interior angle between the wave normal and the axis z is denoted by $\varsigma$. Then one specific incident point can be expressed as (r', $\theta'$, $\varsigma'$). With traditional GRIN lens ray trace format, the ray path C (which represents the radius at distance z) can be represented by P(z), where z is the propagation direction and A is a constant determined by manufacture process, $$\frac{2\pi}{\sqrt{A}}$$

is the period and amplitude is $$\sqrt{r^2 + \frac{\tan^2 \varsigma}{A}}.$$

$$C(z) = r'\cos(\sqrt{A}\,z) + \frac{\tan\varsigma'}{\sqrt{A}}\sin(\sqrt{A}\,z) \quad (25)$$

$$= \sqrt{r'^2 + \frac{\tan^2\varsigma'}{A}}\,\cos\!\left(\sqrt{A}\,z - \tan^{-1}\frac{\tan\varsigma'}{\sqrt{A}\,r'}\right)$$

The refractive index of the o rays and e rays are denoted by $n_o$ and $n_e$ respectively, which are functions of the radius r. Then it is possible to express the refractive index of a GRIN lens in a series form as shown in Eq. 26 below:

$$n_o(r) = n_o(0) + \alpha_1 r + \alpha_2 r^2 + \alpha_3 r^3 + \ldots + \alpha_k r^k,$$
$$(k=1,2,3,\ldots)$$

$$n_e(r) = n_e(0) + \beta_1 r + \beta_2 r^2 + \beta_3 r^3 + \ldots + \beta_k r^k, (k=1, 2,3,\ldots) \quad (26)$$

Where $n_o(r)$ and $n_e(r)$ are the refractive indexes of the o rays and e rays at the centre, and $\alpha_1$, $\alpha_2$, $\alpha_3$, $\alpha_k$ and $\beta_1$, $\beta_2$, $\beta_3 \ldots \beta_k$ are the constants undetermined by the manufacturing process. The effective refractive index ($n_{ee}(r,\xi)$) of the e rays at the local position (r, $\theta$, $\varsigma$) inside the GRIN lens is represented by:

$$n_{ee}(r, \xi) = \frac{n_e(r) n_o(r)}{\sqrt{n_e^2(r)\cos^2\xi + n_o^2(r)\sin^2\xi}} \quad (27)$$

Where $\xi$ is the interior angle between the wave normal and the extraordinary axis, which is a complementary angle to $\in$ inside the GRIN lens. Because of the different refractive index and cosine ray trace, there will be a total phase difference $\sigma$ between the o rays and e rays when the beam reaches the back surface of the GRIN lens. Combined with the equation of its ray trace in the traditional study, i.e., Eq. (25), when the refractive index varies along the optical path, the difference in optical path length (D) can be described by:

$$D(r,\theta,\varsigma) = \int_C (n_{ee}(s) - n_o(s))\,ds \quad (28)$$

Here $n_{ee}(s)$ and $n_o(s)$ are the local refractive index of e rays and o rays, as a function of distance s along the optical path C from the original point (on the front surface) to the back surface. Since the birefringence in GRIN lens is very small, an approximation can be used to let both C of e rays and o rays be the same. Since paralleled incident light ($\varsigma=0$) is used in this disclosure, when r is determined at any position, $\theta$ will not affect the corresponding $\sigma$ since it is $\theta$ independent under this condition, and if the wavelength of the incident beam is defined as $\lambda$ (choosing the integer pitch number N (N=1, 2, 3 . . . ) of GRIN lens for simplify), the overall obtained retardance a of the corresponding point on GRIN lens back surface can be given as:

$$\sigma(r) = 2\pi \cdot D(r)/\lambda \quad (29)$$

The simulation processes corresponding to the GRIN lens in this disclosure are all based on the above Eqs. (25) to (29). It is noted that the simulation results match very well with the experimental cases.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A single-shot Mueller matrix polarimeter, MMP, comprising:
   a polarization state generator, PSG, arranged to receive a source optical field and provide a probe field having a plurality of spatial portions, each portion having a different polarization state;
   a polarization state analyser, PSA, arranged to receive a modified probe field resulting from interaction of the probe field generated by the PSG with a sample under investigation, and further arranged to apply, to each of a corresponding plurality of spatial portions of the modified probe field, a plurality of retardances and a plurality of fast axis orientations; and
   a detector arranged to detect an output of the PSA.

2. The MMP according to claim 1, wherein the plurality of retardances comprises a plurality of retardances spanning $\pi$ radians and the plurality of fast axis orientations comprises a plurality of orientations spanning $\pi$ radians.

3. The MMP according to claim 2, wherein the plurality of retardances comprises a continuum of retardances spanning $\pi$ radians and the plurality of fast axis orientations comprises a continuum of orientations spanning $\pi$ radians.

4. The MMP according to claim 1, wherein the PSG is arranged to provide a probe field having four spatial portions, each described by a different Stokes vector.

5. The MMP according to claim 1, wherein the PSA comprises a pair of gradient-index, GRIN, lenses having a half wave plate located there between, and the modified probe field is arranged to be transmitted through the GRIN lenses and half wave plate to said output.

6. The MMP according to claim 5, wherein the PSA further comprises a linear polarizer after the pair of GRIN lenses.

7. The MMP according to claim 1, wherein the PSG is arranged to provide a probe field having four spatial portions in the form of different segments of a single beam, each segment having a different polarization state.

8. The MMP according to claim 7, wherein the PSG comprises a linear polarizer followed by a four-quadrant quarter wave plate, FQWP.

9. The MMP according to claim 8, wherein the four quadrants of the FQWP have fast axes oriented at 0 degrees, 30 degrees, 60 degrees and −45 degrees relative to an axis of the linear polarizer.

10. The MMP according to claim 8, wherein the PSA comprises a pair of gradient-index, GRIN, lenses having a half wave plate located there between, and the modified probe field is arranged to be transmitted through the GRIN lenses and half wave plate to said output, and wherein the half wave plate of the PSA has a fast axis orientation of 45 degrees with respect to a boundary between any two adjacent quadrants of the FQWP.

11. The MMP according to claim 1, wherein the PSG is arranged to provide a probe field having four spatial portions in the form of four spatially separate beams, and the PSA is arranged to receive a modified probe field resulting from back-scattering of the probe field from the sample.

12. The MMP according to claim 11, wherein the PSG comprises four radially distributed optical fibres each terminated at a respective quarter wave plate.

13. The MMP according to claim 12, wherein each optical fibre receives a portion of a common source optical field, or each optical fibre is coupled to a respective source each of which is arranged to provide a respective source optical field.

14. The MMP according to claim 12, further comprising a plurality of ball lenses, one associated with each of the optical fibres, and arranged to focus the probe field onto the sample.

15. The MMP according to claim 11, further comprising an output optical fibre, or bundle of output optical fibres, arranged to collect the output of the PSA and transmit it to the detector.

16. The MMP according to claim 1, wherein the detector is an array detector, optionally a CCD.

17. The MMP according to claim 1, further comprising a light-emitting diode, or a laser, and a spectral filter, arranged to provide said source optical field.

18. A hardware processor system and a non-transitory computer readable storage medium storing machine-readable instructions, wherein the processor system is arranged to receive data derived from an output of the detector of the MMP according to claim 1, the data being representative of a spatially-varying intensity of the plurality of portions of the modified probe field at the output of the PSA, wherein the machine-readable instructions, when executed, cause the processor system to reconstruct the Mueller matrix of the sample from said data.

* * * * *